US007454367B2

(12) United States Patent
Yu et al.

(10) Patent No.: US 7,454,367 B2
(45) Date of Patent: Nov. 18, 2008

(54) DYNAMIC PRICING SYSTEM AND METHOD

(75) Inventors: Jai-Jein Yu, Fremont, CA (US); Catheryne M. Nicholson, San Carlos, CA (US); Michael Tsunghsi Yu, San Jose, CA (US); Yan Tan, Foster City, CA (US); Do Joon Ra, Mountain View, CA (US); Michael Zhen Hao Li, San Francisco, CA (US); Karen Hsu, Howard, CA (US); Piyush Govil, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 584 days.

(21) Appl. No.: 10/109,957

(22) Filed: Mar. 29, 2002

(65) Prior Publication Data
US 2007/0226064 A1 Sep. 27, 2007

(51) Int. Cl.
*G06Q 30/00* (2006.01)
(52) U.S. Cl. ...................................................... 705/26
(58) Field of Classification Search ................... 705/26, 705/27, 20
See application file for complete search history.

(56) References Cited

U.S. PATENT DOCUMENTS

| | | | | |
|---|---|---|---|---|
| 6,076,070 A * | 6/2000 | Stack | ........................... | 705/20 |
| 6,553,350 B2 * | 4/2003 | Carter | ........................... | 705/20 |
| 6,904,592 B1 * | 6/2005 | Johnson | ........................ | 717/168 |
| 6,934,686 B1 * | 8/2005 | Rajagopalan | ................... | 705/1 |
| 6,976,006 B1 * | 12/2005 | Verma et al. | ................... | 705/27 |
| 7,099,833 B1 * | 8/2006 | Sundaresan | ................... | 705/26 |
| 2001/0034685 A1 * | 10/2001 | Kutaragi et al. | ............... | 705/36 |
| 2002/0013781 A1 * | 1/2002 | Petersen | ........................ | 707/10 |
| 2002/0046128 A1 * | 4/2002 | Abe et al. | ........................ | 705/26 |
| 2002/0171662 A1 * | 11/2002 | Lee | ............................. | 345/593 |
| 2003/0135429 A1 * | 7/2003 | Pous et al. | ..................... | 705/27 |
| 2004/0015415 A1 * | 1/2004 | Cofino et al. | ................... | 705/26 |
| 2004/0199435 A1 * | 10/2004 | Abrams et al. | ................ | 705/27 |
| 2004/0267676 A1 * | 12/2004 | Feng et al. | ................... | 705/400 |
| 2005/0021440 A1 * | 1/2005 | Dresden | ........................ | 705/37 |

* cited by examiner

*Primary Examiner*—Ronald Laneau
(74) *Attorney, Agent, or Firm*—Campbell Stephenson LLP

(57) ABSTRACT

A dynamic pricing system and method that enables prices for sellable objects to be dynamically adjusted using pricing factors corresponding to attributes of the sellable objects. Product administrators are enabled to define sellable products and extended attributes for the products, while pricing administrators are enabled to define price lists for the sellable products and extended attributes. Sales representatives build sellable objects, such as quotes, orders, shopping carts, etc, by adding products that customers would like to purchase to the sellable object. Additionally, extended attributes may be selected for all or a portion of the products. Using Static Pricing, an initial or static price is determined for the sellable objects. The static price may then be dynamically adjusted prior to or at the point of a sales transaction or offer using pricing factors corresponding to combinations of various attributes of the sellable object and/or products from which it is built.

27 Claims, 22 Drawing Sheets

| Customer_Name | Product_Name | Region | Adjustment |
|---|---|---|---|
| IBM | Web Camara | United States | 100% |
| Hewlett Packard | Web Camera | United States | 103% |
| IBM | Web Camara | Japan | 95% |
| Yamaha | Cell Phone | Japan | -10% |

DYNAMIC PRICING SYSTEM AND METHOD

BACKGROUND OF THE INVENTION

1. Field of the Invention

The present invention relates to sales e-business tools in general, and, in more particular, an integrated e-business tool that provides dynamic pricing of products and services based on a variety of user inputs.

2. Background Information

It is common for many sales organizations and businesses to offer products and services that are priced using a fixed pricing model in which base products and various optional features corresponding to those base products each have a predetermined price and whereby an overall or final price is determined by aggregating the base price with the price of all of the optional features selected by the buyer. In many instances, such a pricing structure is available in a published form, including catalogs and various electronic forms provided by on-line wholesalers and retailers.

Although fixed pricing models are important, they limit the flexibility of the sales organizations in many ways. For example, suppose that a salesperson has various clients and potential clients he or she works with. Depending on a client's buying habits and other considerations, it may be desired to provide special pricing to one or more particular customers or clients. Typically, this would be done by hand, wherein the salesperson would determine a price for an item using a static pricing model technique, and then manually apply a discount or other type of price adjustment. In another case, it might be desirable to have a price adjustment be made based on a volume level or cost level of the purchase. In other instances, it may be desirable to combine price adjustments based on a plurality of considerations, such as provide special pricing based on attributes of the products being purchases, transactions attributes (e.g., customer, company, location, shipping, etc.), and/or other considerations.

SUMMARY OF THE INVENTION

The present invention comprises a dynamic pricing system and method that allows product administrators, pricing administrators, and sale representatives to work together to define market products and price and sell those products to customers with dynamically-adjusted prices. The system enables product administrators to define sellable products and extended attributes for the products. The sellable products include most any type of product or service that may be sold. The extended attributes are additional information or selectable options corresponding to a given product. For example, a dress shirt may have extended attributes including a color and size.

In addition to defining sellable products and extended attributes, in one embodiment pricing administrators are enabled to define price lists for the sellable products. Each price list defines prices for all or subset of the products. Furthermore, each product can have different prices under different price lists. During price list definition, the pricing administrator(s) also defines pricing for specific products based on each product's base (i.e., list) price and extended attributes that are applicable to the products.

In one embodiment, using the system's "Static Pricing," sale representatives can define Sellable Objects to sell to customers. Typically, a sellable object will include one or more products that are collectively offered for sale via a single transaction, such as a quote, order, shopping cart, etc. In one embodiment, when a sales representative prepares a quote for a customer, the representative will choose a particular price list based on the customer's region and type. The representative adds products that customers would like to purchase into quotes and selects extended attributes for all or a portion of the products. Initially, the prices of the products that make up a sellable object are determined based on the chosen price list, the particular products, and extended attribute selections for those products.

In addition to this "Static Pricing," a pricing administrator can define price factors to dynamically adjust the price based on various attributes pertaining to the sellable object. For example, attributes that typically might be considered during dynamic price adjustment include the customer's name, company, time of sale, shipping method, products selected, and extended attributes selected. Based on one or both of two types of pricing factors, the static price for a sellable object may be dynamically adjusted prior to an offer being made or prior to the point of sale. These pricing factors, which include matrix-based factors, are defined by pricing administrators. Each pricing factor defines a mechanism by which prices for products and sellable objects are dynamically adjusted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 9 is a representation of an exemplary user interface that enables users to prepare quotes in accordance with one embodiment of the invention;

Figure 12:
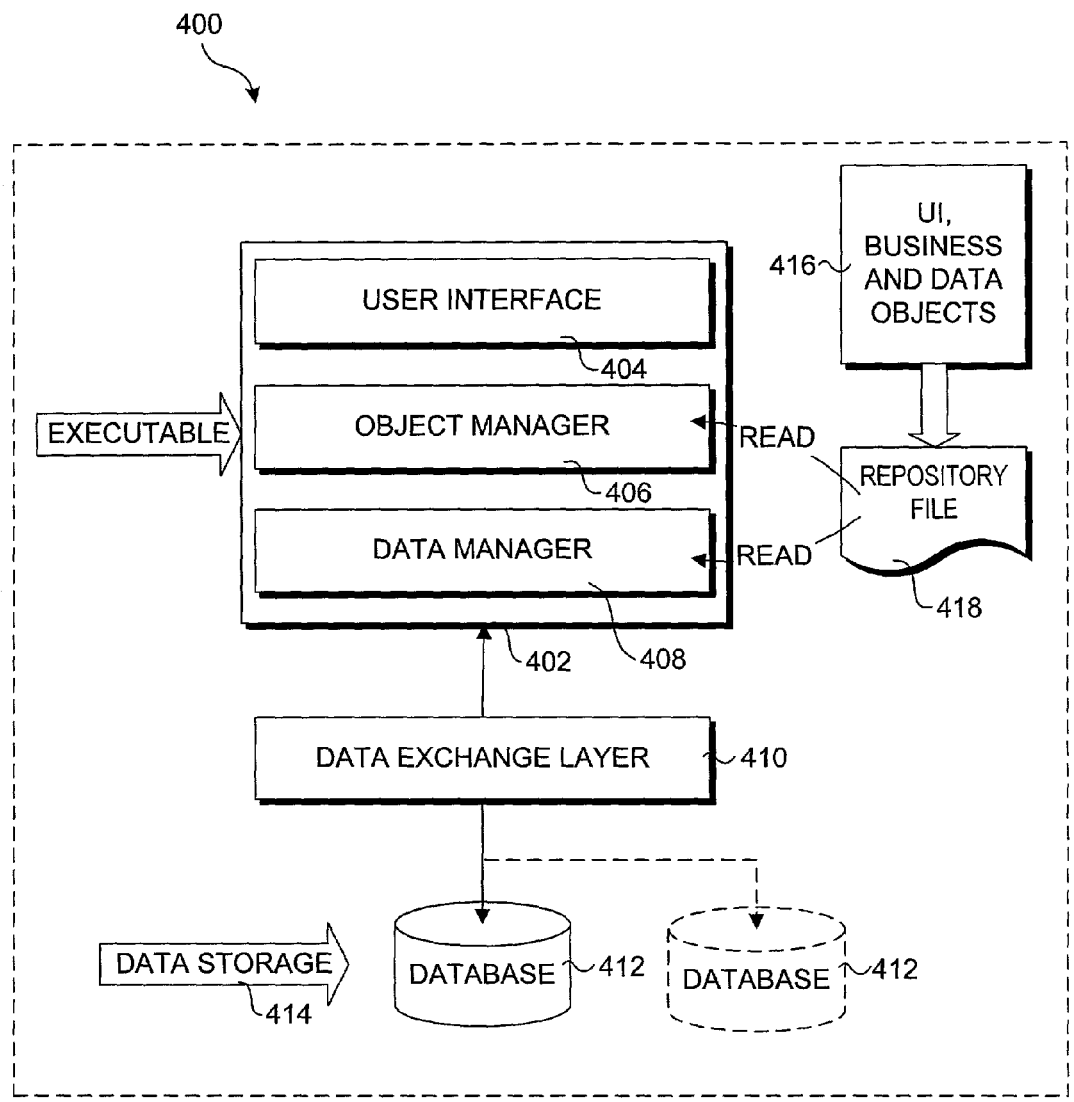
Figure 13:
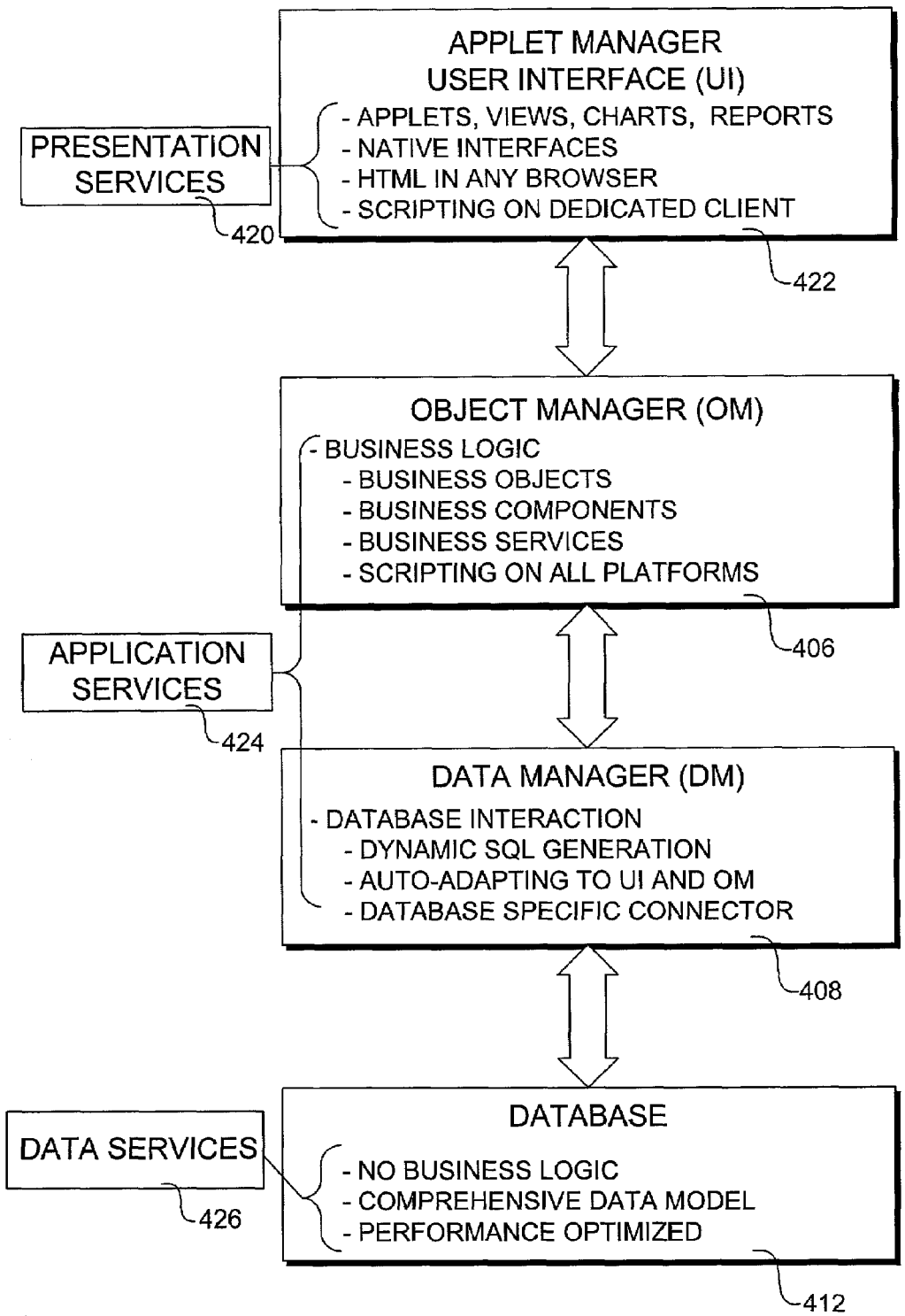
Figure 14:
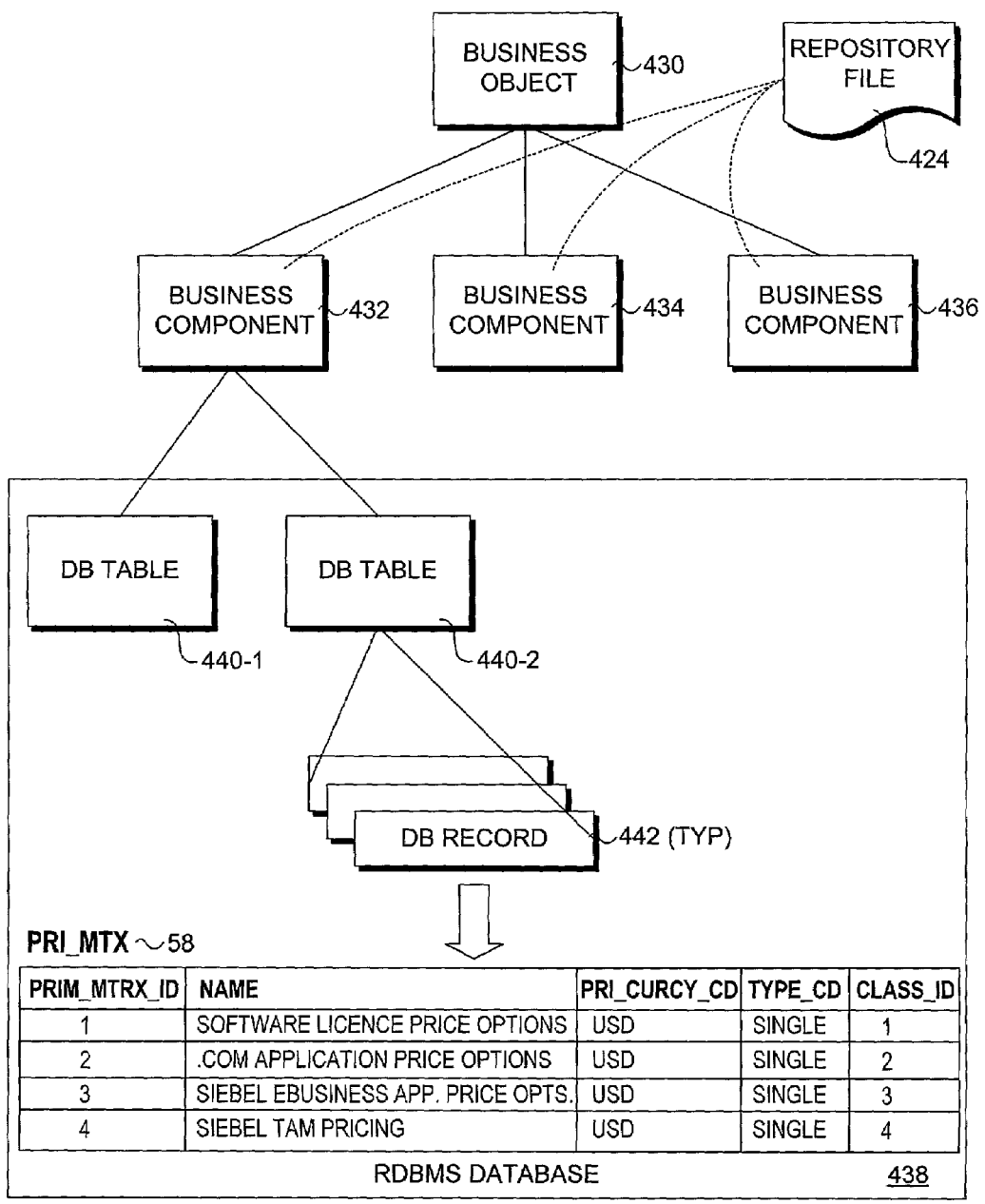
Figure 15:
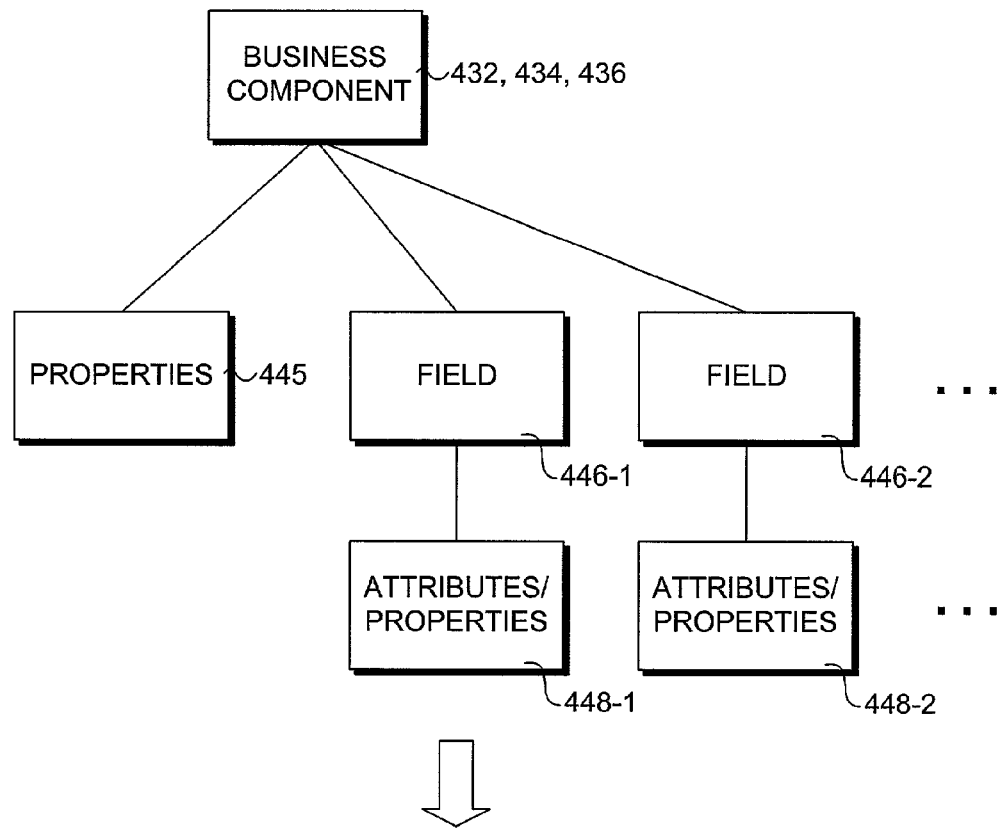
Figure 16:
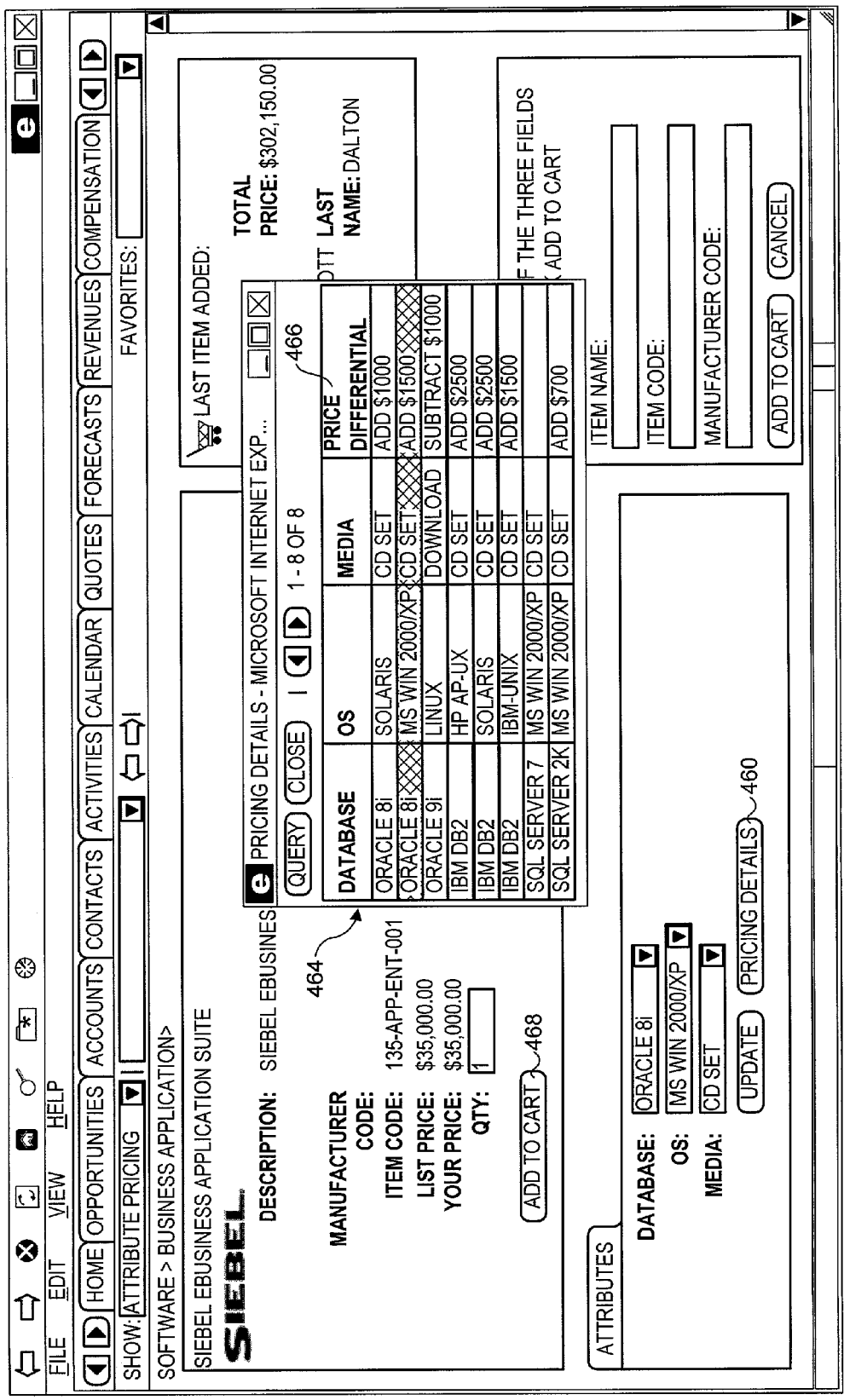
Figure 18:
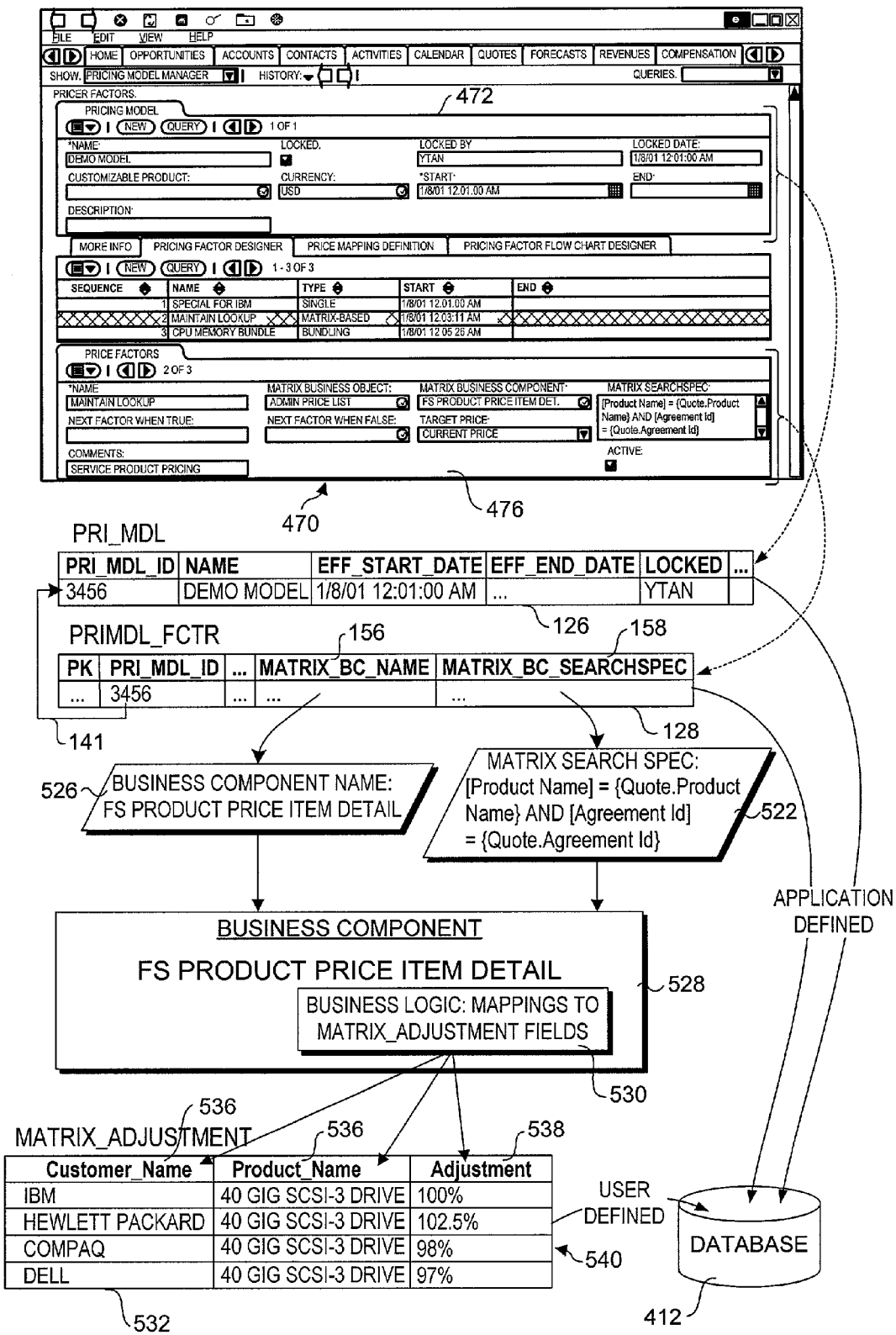
Figure 19:
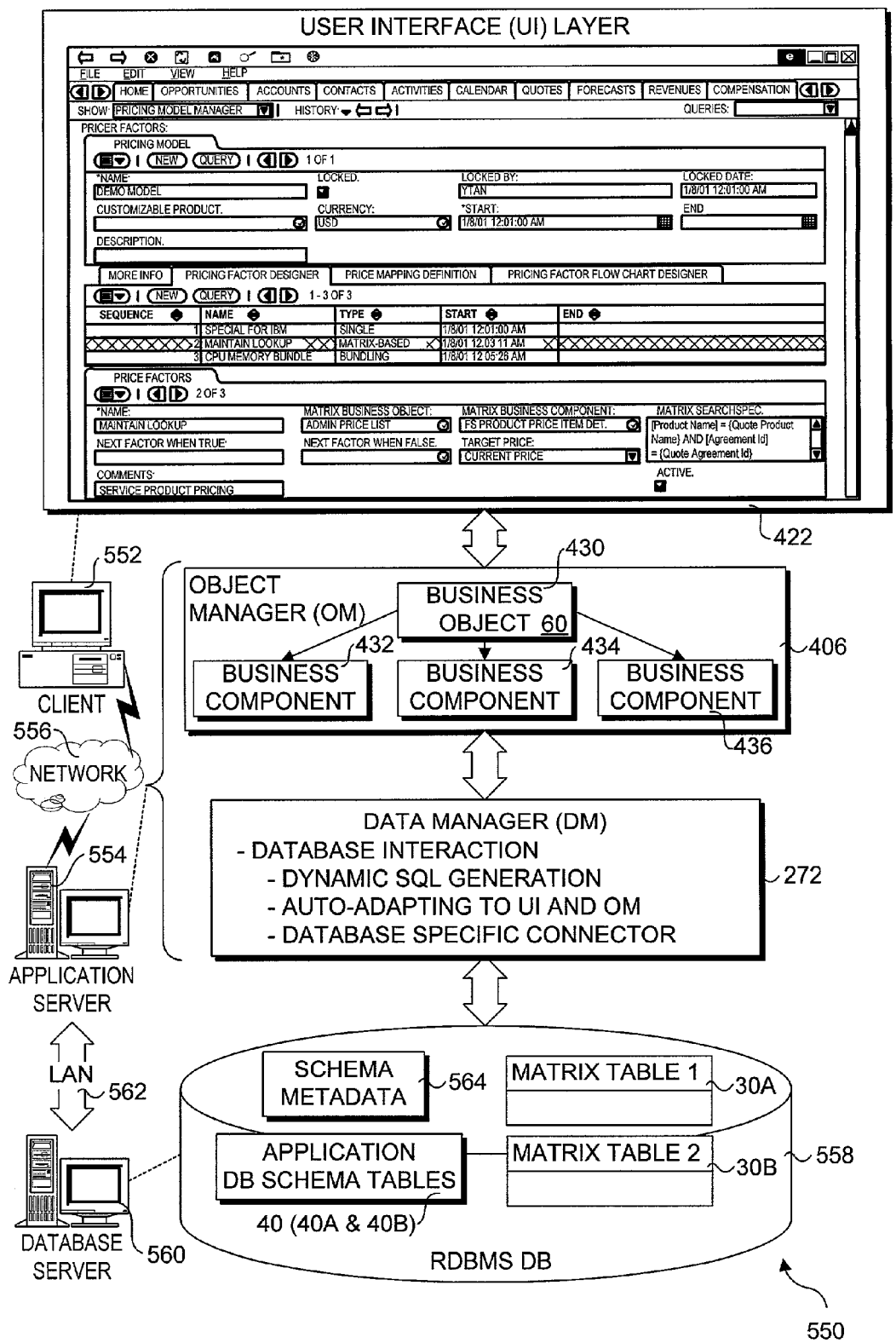
Figure 20:
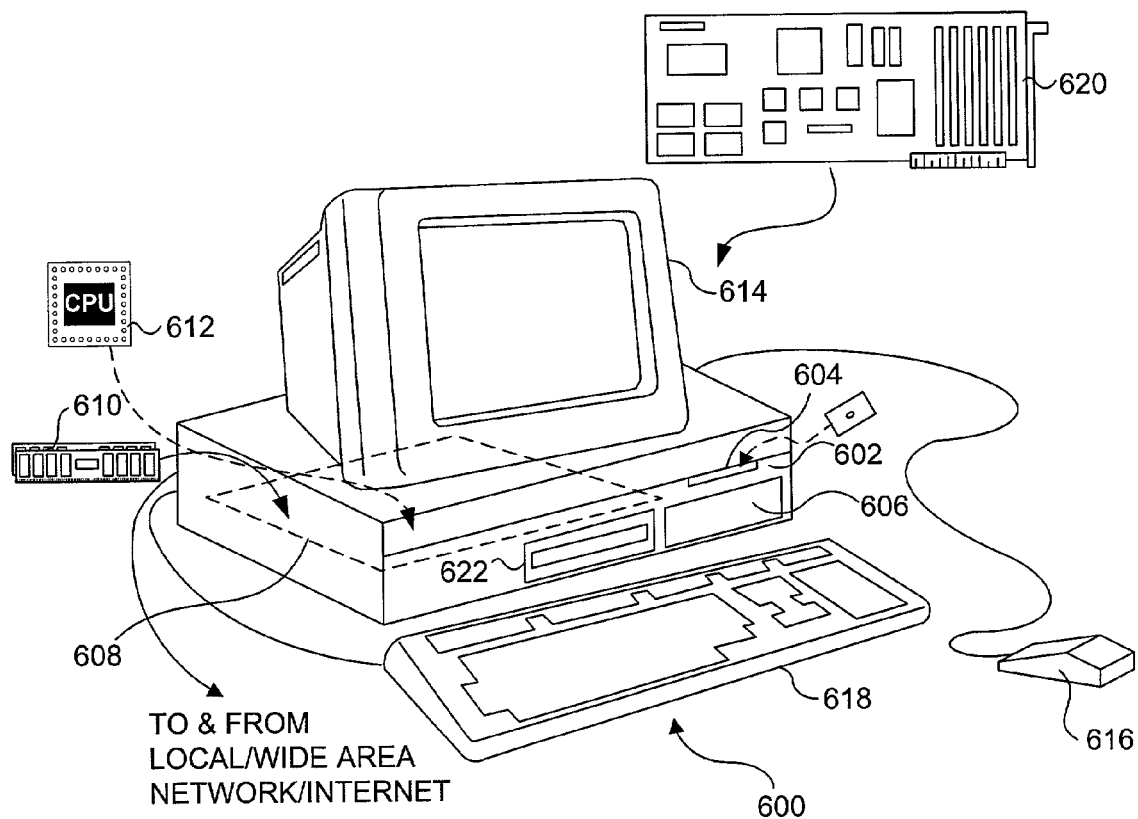

FIG. 12 is a block schematic diagram corresponding to a multi-layer software architecture used to implement software aspects of the invention in accordance with one embodiment of the invention;

FIG. 13 is a block schematic diagram showing further details of the multi-layer software architecture of FIG. 12;

FIG. 14 is a block schematic diagram illustrating the hierarchical relationship between business objects, business components, and data storage in accordance with the multi-layer architecture of FIG. 13;

FIG. 15 is a block schematic diagram illustrating further details of a business component;

FIG. 16 is a representation of an exemplary user interface that enables users to see pricing details of corresponding to a product having a multiple attribute type when preparing a quote;

Figure 17:
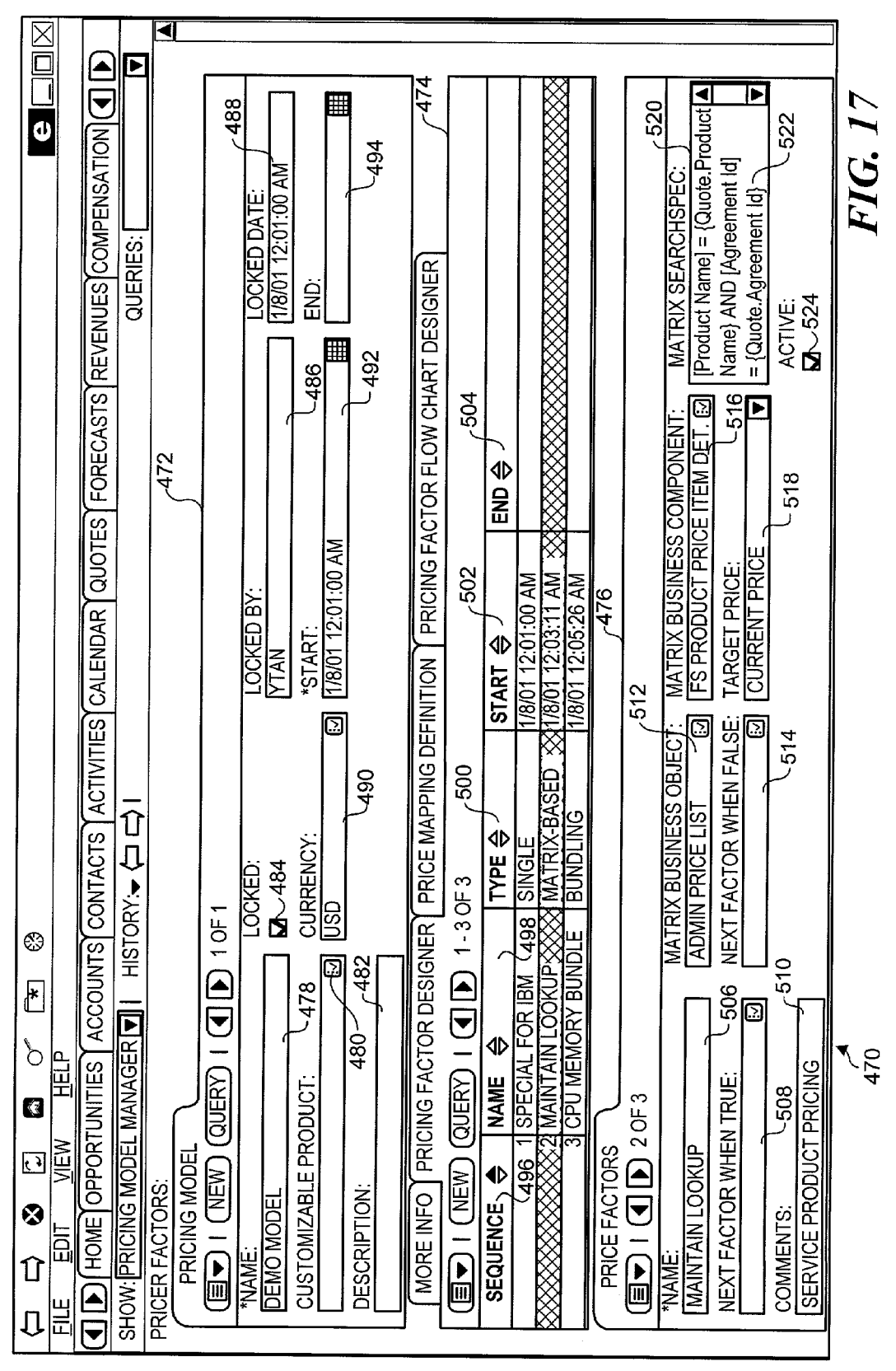

FIG. 17 is a representation of an exemplary user interface that enables users to specify price factor details for matrix-based pricing factors in accordance with one embodiment of the invention;

FIG. 18 is a block schematic diagram illustrating data storage aspects corresponding to an exemplary implementation of matrix-based pricing factors;

FIG. 19 is a block schematic diagram illustrating a physical architecture used to implement that multi-layer software architecture of FIGS. 12 and 13; and FIG. 20 is an exemplary computer system that may serve as a client or server machine that is used to run software modules in accordance with embodiments of the invention disclosed herein.

DETAILED DESCRIPTION OF THE
ILLUSTRATED EMBODIMENTS

A dynamic pricing system and method is described in detail herein. In the following description, numerous specific details are provided, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
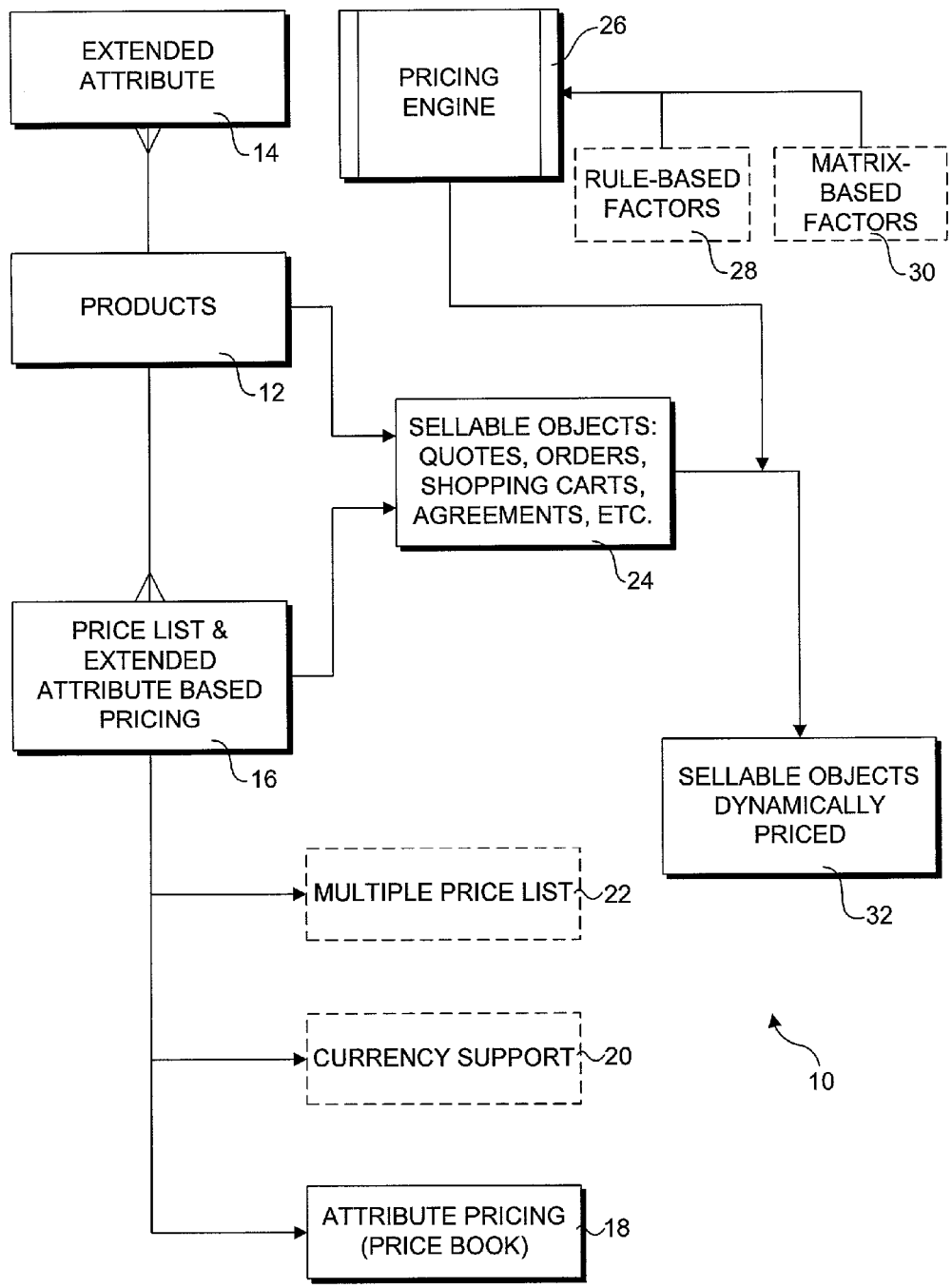
FIG. 1 is an object architecture schematic diagram illustrating a high-level object architecture in accordance with one embodiment of the invention.

An object architecture diagram 10 corresponding to one embodiment of the invention is shown in FIG. 1. Object architecture 10 includes a products object 12, corresponding to products that a company may offer for sale and/or sold to customers. As used herein, a product comprises any sellable item, including goods and services, service contracts, entertainment, recreation activities, etc. One or more extended attributes 14 may be selected/specified for each product. Pricing information for each product are defined in one or more price list and extended attribute based pricing objects 16, which are based on an attribute pricing (price book) object 18, and may receive optional input from a multiple price list object 20 and a currency support object 22.

Products 12 and price list and extended attribute-based pricing objects 16 are used to build sellable objects 24, which include quotes, orders, shopping carts, purchase agreements, etc. In accordance with one aspect of the invention, pricing for sellable objects 24 may then be dynamically adjusted by a pricing engine 26, based on pricing/adjustment rules defined in rule-based factors 28 and matrix-based factors 30, resulting in dynamically priced sellable objects 32.

Figure 2:
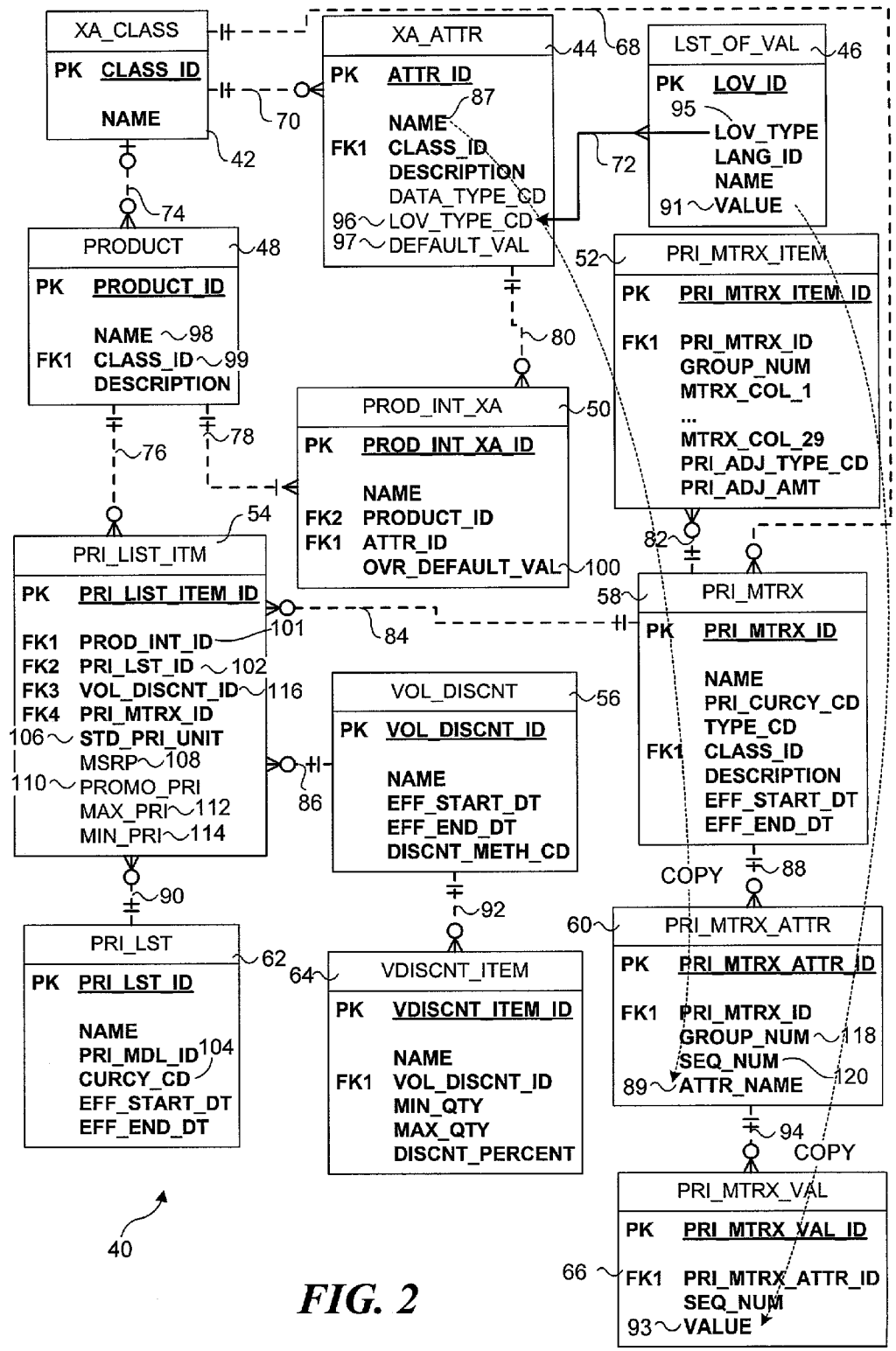
FIG. 2 is an exemplary physical database model diagram illustrating a first portion of a database schema corresponding to the object architecture of FIG. 1 in accordance with one embodiment of invention.

A physical database model diagram 40A corresponding to a first portion of object architecture diagram 10 is shown in FIG. 2. Physical database model 40 includes an XA_CLASS (extended attributes class) table 42, an XA_ATTR (extended attributes) table 44, a LST_OF_VAL (list of values) table 46, a PRODUCT (products) table 48, a PROD_INT_XA (products extended attributes) intersection table 50, and a PRI_MTRX_ITEM (pricing matrix item) table 52. The physical database model further includes a PRI_LIST ITEM (price list item) table 54, a VOL_DISCNT (volume discount) table 56, a PRI_MTRX (pricing matrix) table 58, a PRI_MTRX_ATTR (pricing matrix attribute) table 60, a PRI_LST (price list) table 62, a VDISCNT_ITEM (volume discount item) table 64, and a PRI_MTRX_VAL (pricing matrix value) table 66. Each table includes one or more columns, wherein column names having an adjacent "PK" are primary key columns, while column names having an adjacent "FK#" correspond to foreign keys columns. Data in the tables are linked by various relationships between a foreign key in a child table, and a primary key in a parent table, as shown by one-to-many relationships 68, 70, 74, 76, 78, 80, 82, 84, 86, 88, 90, and 92.

XA_CLASS table 42 holds class identifiers (in a CLASS_ID column 93) corresponds to Extended Attribute Classes. Each extended attribute class comprises one or more extended attributes whose definitions are stored in XA_ATTR table 44. Extended attributes pertain to features and/or options that may be applied to the product they are associated with. For example, a Polo Shirt product can have extended attributes including a Color and a Size, with the list of values for Color including Blue, Red, White and a list of values for Size including Large, Medium, Small. These extended attributes may include Text, Number, Boolean, and Date data types.

Each extended attribute row may contain a link to a List of Values stored in LST_OF_VAL table 46. The list of values determines the domain, i.e., the possible values, for the attribute to which it corresponds, and are linked to a corresponding attributes via a LOV_TYPE column 95 and a LOV_TYPE_CODE column 96 in XA_ATTR table 44. In accordance with conventional data modeling rules, since this relationship is not between a foreign key column in a child table and a primary key column of a parent table, the relationship must be maintained outside of the data model via appropriate business rules. Accordingly, the relationship is depicted as a business rule (BR) many-to-one relationship 72. Each attribute may optionally be assigned a default value via a DEFAULT_VAL column 97. In cases in which a corresponding list of values are defined, this column value may be used to define the default value that appears in a dropdown control that is used to enable a user to select a value from among various values in the list, as described below in further detail.

PRODUCT table 48 includes a NAME column 98 in which a description of each product is stored and a CLASS_ID foreign key column 99, which is used to link an extended attribute class to selected products in the PRODUCT table.

The attributes for a given product may be specified individually, or via an extended attribute class, wherein the product inherits all of the attributes defined for that extended attribute class. Furthermore, the same extended attribute class can be shared by more than one product.

Extended attributes for a given product may be specified individually via records stored in PROD_INT_XA intersection table 50, which forms a linking relationship between PRODUCT table 48 and XA_ATTR table 44. In order to allow the products' attributes to have different default values than the ones defined in the extended attribute class selected for the product, an overriding default value may be stored in an OVR_DEFAULT_VAL column 100 in PROD_INT_XA table 50. If no override exists, all properties of a product's attributes are derived from the attributes defined in the extended attribute class associated with the product.

A product can be linked to a price list via PROD_INT_ID and PRI_LST_ID foreign key columns 101 and 102 in PRI_LIST_ITEM table 54. A currency may be defined for each record in the price list via a CURCY_CD column 104 in PRI_LST table 62. The price list item "wraps" a product and can contain multiple data items related to the pricing of a product, including a List Price (defined in a STD_PRI_UNIT column 106), a Manufacturers Suggested Retail Price (defined in an MSRP column 108), a Promotional Price (defined in a PROMO_PRI column 110), a Maximum Price (defined in a MAX_PRI column 112) and Minimum Price (defined in a MIN_PRI column 114).

A Price List Item may optionally contain a reference to a Volume Discount stored in VOL_DISCNT table 56 via a VOL_DISCNT_ID foreign key column 116. Each Volume Discount is defined by one or more Volume Discount Items that are stored in VDISCNT_ITEM table 64, wherein each Volume Discount Item specifies a discount to the list price specified for the Price List Item over a respective quantity range.

In one embodiment, a utility is provided to transform the prices in a price list to correspond to another currency. The applicable currency is specified by a CURCY_CD (currency code) column 104. The utility converts all of the prices referenced by a price list to correspond to a selected currency by modifying the price of applicable products using a pro-rated percentage defined for the currency in a currency table (not shown) referenced by CURCY_CD column 104. The utility can also use rules defined in a pricing model to modify the list price of applicable Price List Items.

In addition to the relationship between tables defined by the physical database model of FIG. 2, there is also some denormalization that is performed, wherein the same data are stored in more than one place to improve performance. For example, data in a NAME column 87 of XA_ATTR table 44 are copied to an ATTR_NAME column 89 of PRI_MTRX ATTR table 60. Also, data in a VALUE column 91 in LST_OF_VAL table 46 are copied to a VALUE column 93 in PRI_MTRX_VAL table 66. Generally, denormalization of a data model provides improved query speeds, while simplifying the underlying data model used by the application. The drawback is that the "integrity" of the data model is no longer entirely defined by the database schema, since the denormalization must be handled by business logic rather than the rules defined by the relational database model.

Attribute Pricing

If the Product referenced by a Price List Item is associated with a Class and has inherited attributes, the Price List Item (stored in S_PRI_LST_ITM table 54) may optionally contain a reference (PRI_MTRX_ID) to a Price Book (stored in S_PRI_MTRX table 58) based on the same class and currency code as the price list.

A Price Book defines price adjustments to the list price based on selected attribute values. The set of attributes that can possibly affect the price are the attributes in the Class, associated with the price book, which have a list of values. The set of extended attributes that may affect pricing are added by an administrator to Price Book Attributes stored in S_PRI_MTRX_ATTR table 60, while price values are stored in S_PRI_MTRX_VAL table 66.

A Price Book can comprise one of two types of configurations—Single Attributes and Multiple Attributes. In the case of Single Attributes, the attributes are independent of one another. The selection by the end-user of a value for an attribute will contribute an adjustment to the final price independently of all other attribute values. In the case of Multiple Attributes, the pricing adjustments are defined for a combination of attribute values.

The benefit of using a Single Attributes-type Price Book is that the user interface (UI) is simpler to render and understand. For each attribute, a drop-down control with a set of attribute values and a corresponding price difference for that attribute is displayed to the user. The benefit of a Multiple Attributes-type Price Book is that a different price adjustment can be defined for every combination of attribute values. To illustrate the price difference for choosing different combinations, the end-user can view a table showing the different combinations and the price difference for each. The end-user can also select a combination by clicking a button next to the combination they want. The disadvantage, however, is that the administrator may have to define large numbers of adjustments to handle all combinations. The compromise is to use groups, as discussed below.

When an extended attribute is added to the Price Book Attributes (PRI_MTRX_ATTR table 60), its name is copied to the record in an ATTR_NAME column 117. A group number (stored in a GROUP_NUM column 118) and sequence number (stored in a SEQ_NUM column 120) are also assigned. If the Price Book comprises a Single Attributes-type, each attribute added is considered to be in its own group and is assigned its own group number, wherein the group number begins at 1 and is incremented by one for each subsequent entry. Since it is the only the attribute in its group, each attribute will get a sequence number of 1. If the Price Book comprises a Multiple Attributes-type, all attributes added are considered to be in the same group and all will be assigned the group number 1. Furthermore, each attribute will be assigned is own sequence number, wherein the SEQ_NUM value begins with 1 and is incremented by 1 for each subsequent attribute defined for a given group.

In addition to the two types of Price Books discussed above, a more general case can be supported using the same data model. In the general case, Price Book Attributes (PRI_MTRX_ATTR table 60) with the same group number are considered to be in the same group. Within each group, each attribute is assigned a different sequence number. Price adjustments are defined independently for each group of attributes. This may reduce the number of adjustments (defined by records in PRI_MTRX_ITEM table 52) needed, compared to defining combinations of all attributes, such as in the Multiple Attributes case, while still allowing more flexible pricing compared to Single Attributes. For each group, the UI shows a table of combinations of attribute values and the price difference to the list price for selecting that combination.

The Price Book Item (PRI_MTRX_ITEM table 52) stores the combination of attribute values for each group and the price adjustment to the list price for selecting that combination. Each item contains a group number indicating which group the item applies to. PRI_MTRX_ITEM table 52 also contains a fixed number of columns (MTRX_COL_1-MTRX_COL_29) that, for each attribute in the group, stores the sequence number of the attribute value (stored in PRI_MTRX_VAL table 66) it represents.

A utility is also provided to automatically generate Price Book Items. For each group of attributes, the administrator selects the attribute values defined in PRI_MTRX_VAL table 66 that affect pricing. For combinations of attribute values, the utility generates Price Book Items (PRI_MTRX_ITEM table 52) with some default adjustment type and a default amount of 0. This is useful if there are many attributes in the group and many combinations. To modify an entry, the administrator simply goes to the created items and changes the adjustment type or amount.

Sellable Objects

In a normal business process, a sales representative will create a quote for a customer by selecting available products either directly from a product pick list or via an electronic product catalog. The quote can be associated with a currency and a price list. Upon picking or adding a product to the quote, the pricing engine, a business service, will automatically calculate its price if such product is listed in the quote's price list and then apply the price to this product in the quote. If there is any discount associated with the product, the quantity of product (volume discount) added to the quote, or the opportunity, account, contact of the quote (pricing factors and rules), the discount will also be populated to the quote. If there should be any changes to the price or discount to the same product, the sales rep can also activate a "Reprice" button to obtain the newest price.

When a quote is completed and the customer would like to make the order or an agreement, the sales rep can proceed to generate an order or an agreement from the quote with all the product and price information. Meanwhile, the sales rep can follow the same procedure as configuring a quote to generate an order or an agreement from scratch. Because both of orders and agreements have the same mechanism as quotes to interact with the same pricing engine, the system facilitates the quote and order process and eliminates unnecessary training on each of the modules used by the sales reps.

When used in an online shopping environment, a user, customer, or partner can browse a online site's product catalog and add the products he or she wants to a shopping cart, and then perform a checkout process to order the products. During the checkout process, a dynamic pricing system module, which is used by the online retailer or wholesaler to support online shopping carts, performs essentially the same operations as described above with reference to processing quotes. Thus, the flow of shopping cart to order in the shopping cart environment is the same as the flow from quote to order described above. The prices and possible discounts of products added to the cart are also obtained from the pricing engine via the same flow.

In view of the teachings and principles of the invention, additional independent modules involving sellable objects can be easily added to the same business flow if needed to achieve additional goals. Such additional modules should be fairly easy to configure and should not have a big learning curve because of the architecture of the dynamic pricing system.

Pricing Engine

Pricing engine 26 is used to dynamically adjust the cost of products, orders, and agreements. The pricing engine receives pricing models defined by pricing administrators as an input. A pricing model is a group of pricing factors to be used together to calculate the price adjustments for a related product or sets of products. Each pricing factor represents a mechanism for price adjustments. Inside each model, pricing factors are setup to be applied using a predefined sequence, which is defined during pricing model setup. A pricing model may apply to one or more price lists. All price lists that reference a pricing model support dynamic pricing.

During sale representatives' preparation of sellable objects, static prices for the various products and selected extended attributes are obtained from price and price book data. During the dynamic price calculation, pricing engine 26 reads the definition of the pricing model that is applicable to the chosen price list of sellable objects. The pricing engine considers all pricing factors within the model in order, based on the predefined sequence. Each pricing factor may be used to adjust the price of an individual item in the sellable object or the sellable object as a whole. After all the pricing factors are considered, a final price is determined for each sellable object, resulting in the dynamically-priced sellable objects 32 shown in FIG. 1.

Figures 3, 4:
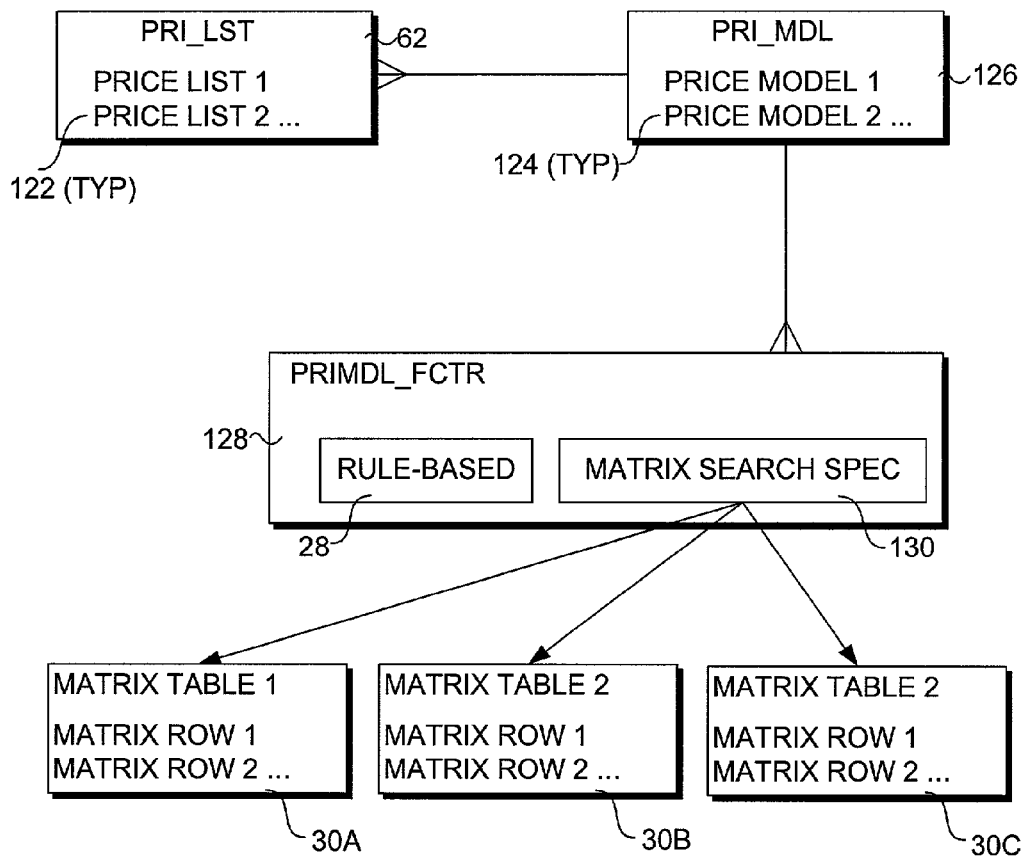
FIG. 3 is an object relational diagram illustrating the objects used by a pricing engine to facilitate dynamic price adjustments in accordance with one embodiment of the invention.
FIG. 4 depicts an exemplary matrix table in which a plurality of matrix-based pricing factors are defined.

The relationship between price lists, pricing models, and pricing factors are shown in FIG. 3. Price engine 26 processes price lists 122 that are stored in PRI_LST table 62. Each price list can be based on one or more pricing models 124 stored in a PRI_MDL (pricing model) table 126. Each pricing model 124 is built using pricing factors stored in or referenced by data stored in an PRIMDL_FCTR (pricing model factor) table 128, including rule-based factors 28. PRIMDL_FCTR table 128 also includes search specifications 130, which are used to retrieve matrix-based rules from user defined matrix factor tables, as depicted by matrix factor tables 30A, 30B, and 30C.

Rule based pricing factors 28 have a general structure of:

$$\text{If Condition then pricing action} \qquad (1)$$

When a Condition is true, the corresponding pricing action is taken to adjust the price. The pricing action can adjust the price in the following ways:

1) Increase or decrease the price by an amount;
2) Increase or decrease the price by a percentage;
3) Multiply the price by a factor;
4) Round the price to a number of decimals specified; and
5) Raise the price to the power of a specified number Conditions are defined using the following structure:

$$\text{Left Side Value [Operator] Right Side Value} \qquad (2)$$

The Left Side Value is an attribute of the object to be priced. This may include a buyer's information, Shipping destination, customer's relationship, amount of product being purchased, name or type of product being purchased, etc. The Left Side Value can also be based on the extended attribute of the product, such as the resolution or size of a computer monitor. The Left Side Value may comprise Text, a Date, Number, Integer, Boolean, or other standard type of data, and is stored as a business component.

The operator identifies the type of comparison between the Left Side Value and the Right Side Value. Values for operators include >, <, >=, <=, +, <>, EXIST IN, and DOES NOT EXIST IN.

The Right Side Value is the value defined with the rule. It may comprise one or more constant values or data residing in the database. Constant values are defined directly in the rule definition. A constant value can comprise text (e.g., "Gold Partner"), numbers (e.g., 10.5), integers, dates, Boolean values, etc. The data are defined as a combination of a target database table and search criteria. All of the data in the target table that meets the search criteria comprise right side values. For example, all names in a Customer table with a type="Gold Customer" would have their quote or agreement prices adjusted based on the price adjustment rules for "Gold Customers."

Further examples of rule-based factors include:

---
If [Customer Name = "Proctor and Gamble" or "Kraft Foods"] Then [decrease the price by 10%]
and
If [Customer Name matches any result in database search in Account Table where Account Type = "Gold Partner" ] Then [Decrease the price by 10 dollar]
---

Matrix-based pricing factors provide price adjustments based on data contained in a matrix-style structure. Price adjustments are dependant on the search result. Matrix-based factor definitions include target search tables and search criteria. The search criteria comprise search specifications that are applied to the target tables to return applicable pricing adjustment actions. For instance, search specifications identify fields in the target search targets table to match/compare with product instance data, such as a customer name.

During dynamic pricing operations, pricing engine 26 builds a run-time SQL statement to be used for the matrix search. The SQL statement contains target tables and search specification as defined in the matrix factor definition.

The pricing actions based on matrix-based factors include:
1) Increase or decrease the price by an amount.
2) Increase or decrease the price by a percentage.
3) Multiply the price by a factor.
4) Round the price to the number of decimals specified.
5) Raise the price to power of a specified number.

An example of matrix factor definitions contained in a matrix 132 are shown in FIG. 4. Matrix 132 is defined such that a seller may sell products at different prices based on the purchaser (Customer_Name) and sales region (Region). Typically, matrixes such as matrix 132 will be stored in a matrix factor table, such as matrix factors table 30A, 30B, and 30C.

In one embodiment, a price administrator can set up a pricing factor that adjusts prices corresponding to the factors specified by matrix 132 by specifying that table the matrix is stored in and specifying a search specification as follows:

[Customer_Name]={Quote.Customer_Name} AND
[Product_Name]={Quote Item.Product_Name} AND
[Region]={Quote.Customer_Region}

The meaning of this search specification is to search for all records in the target table that have a Customer_Name column that matches the buyer's (customer) name in the quote and the Product_Name field value matches the Product Name being purchased in the quote and the Region field matches the quote's region. The price is then adjusted using the price adjustment factor for the record(s) that match the search specification, as defined in the adjustment column. For example, if IBM is buying a web camera in the United States, the adjusted price for the web camera will be equal to a pre-adjusted price (i.e., the price after static pricing operations have been performed, such as a list price), while if IBM is buying a web camera in Japan, the adjusted price is 95% of the pre-adjusted price. Similarly, if Yamaha is buying a cell phone in Japan, they would get 10% off the pre-adjusted price.

A sequencing of pricing factors may also be setup by the pricing administrator. The pricing administrator can indicate the starting factor as the first factor to be considered during pricing. Pricing administrators can also specify the next pricing factor to be considered if the current pricing factor fired (i.e., conditions for the factor are met), and the next factor when the factor is not fired (conditions are not met). A rule-based factor is fired when it condition is true. A matrix based factor is considered to be fired when a matrix search result returns at least one record. The pricing process ends when no more pricing factors are to be considered or an exit factor is reached. An exit factor is a special factor that indicates the end of pricing process.

Figure 5:
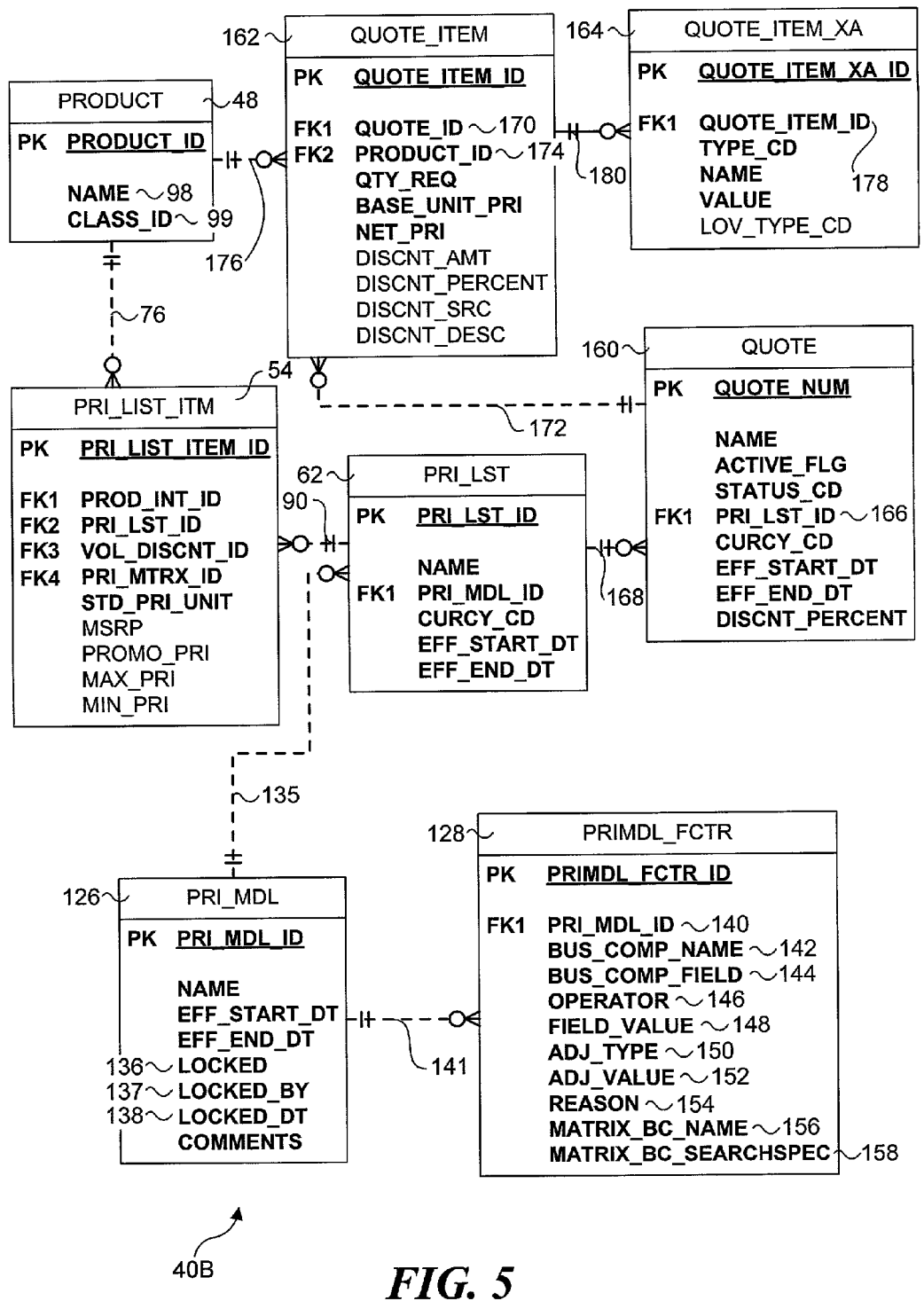
FIG. 5 is a physical database model diagram illustrating a second portion of the database schema of FIG. 2 corresponding to the object relational diagram of FIG. 3.

An exemplary physical model diagram 40B that includes table structures corresponding to the entities in the relational model of FIG. 3 and further includes tables used for producing quotes as described below is shown in FIG. 5. PRI_MDL table 126 is linked to PRI_LST table 62 via a PRI_LST_ID foreign key column 134 so as to define a many-to-one relationship 135. LOCKED, LOCKED_BY, and LOCKED_DT columns 136, 137, and 138 contain locking data that provides a mechanism whereby a pricing model may be locked by an administrator so as to ensure that multiple users cannot make simultaneous changes to the model and prevent the pricing model from being used until the administrator is making changes to it. LOCKED column 136 holds a Boolean value indicating whether a model defined by a given row's data is locked. LOCKED_BY column 137 contains the userID of the last person to lock the pricing model corresponding to the row, and LOCKED_DT column 138 contains the date and time when the row's corresponding model was most-recently locked.

PRIMDL_FCTR (Price Model Factors) table 128 includes the definitions for rules-based pricing factors and provides search specifications for matrix-based rules that are stored in various external tables, such as matrix factors tables 30A, 30B, and 30C. PRIMDL_FCTR table is linked to PRI_MDL table 124 via a PRI_MDL_ROW_ID foreign key column 140 so as to define a many-to-one relationship 141. The name of the business component for the Left Hand Value of a business rule is stored in a BUS_COMP_NAME column 142, while the name of the field for the Right Hand Value is stored in a BUS_COMP_NAME column 144. The Operator for the pricing rule is stored in an OPERATOR column 146. The value for the Right Hand Value is stored in a FIELD_VALUE column 148. The type of adjustment (e.g., % off, $ off, etc.) is stored in an ADJ_TYPE column 150, while the value for the adjustment is stored in an ADJ_VALUE column 152.

The reason for the pricing adjustment is stored in a REASON column 154. For example, if a particular customer receives a 10% discount, this will be contained in the REASON column for the rule. If multiple discounts are applied, implying rules defined by a plurality of rows, the data in REASON column 154 for those rows are concatenated.

The last two columns pertain to matrix-based pricing factors. The name of the target business component in the matrix search is stored in a MATRIX_BC_NAME column 156. Typically, this may comprise the name of an applicable table in which matrix-based pricing information is stored. The search specification for the matrix-based factor is stored in a MATRIX_BC_SEARCHSPEC column 158.

In addition to the pricing model tables discussed above, physical model diagram 40B further includes and exemplary set of tables that enable quotes that are based on the dynamic pricing capabilities of the system to be generated. These tables include a QUOTE table 160, a QUOTE_ITEM table 162, and a QUOTE_ITEM_XA table 164. QUOTE table 162 is used to store quote header information and is linked to PRI_LST table 62 via a PRI_LST_ID foreign key column 166 to create a many-to-one relationship 168. QUOTE_ITEM table 162 stores detailed quote items and is linked to QUOTE table 160 via a PRODUCT_ID foreign key column 170 to create a many-to-one relationship 172. QUOTE_ITEM table 162 is also linked to PRODUCT table 48 via a PRODUCT_ID foreign key column 174 to create a many-to-one relationship 176. QUOTE_ITEM_XA table 164 stored extended attributes for the quote items and is linked to QUOTE_ITEM table 162 via a QUOTE_ITEM_ID foreign key column 178 to create a many-to-one relationship 180.

Representations of various exemplary user interface views containing forms for defining products, attributes, prices, quotes, etc., are shown in FIGS. 6, 7A, 7B, 8A, 8B, 9, and 10. In the views, there are several encircled letters having a lead line pointing to one or more input fields. Corresponding encircled letters are depicted in FIGS. 11A and 11B, which illustrates various tables corresponding to the database models of FIGS. 2 and 5 populated with data corresponding to the views of FIGS. 6, 7A, 7B, 8A, 8B, 9, and 10, wherein each encircled letter in FIGS. 11A and 11B depicts where the data corresponding to the same encircled letter in FIGS. 6-10 are stored based on the data models.

Figure 6:
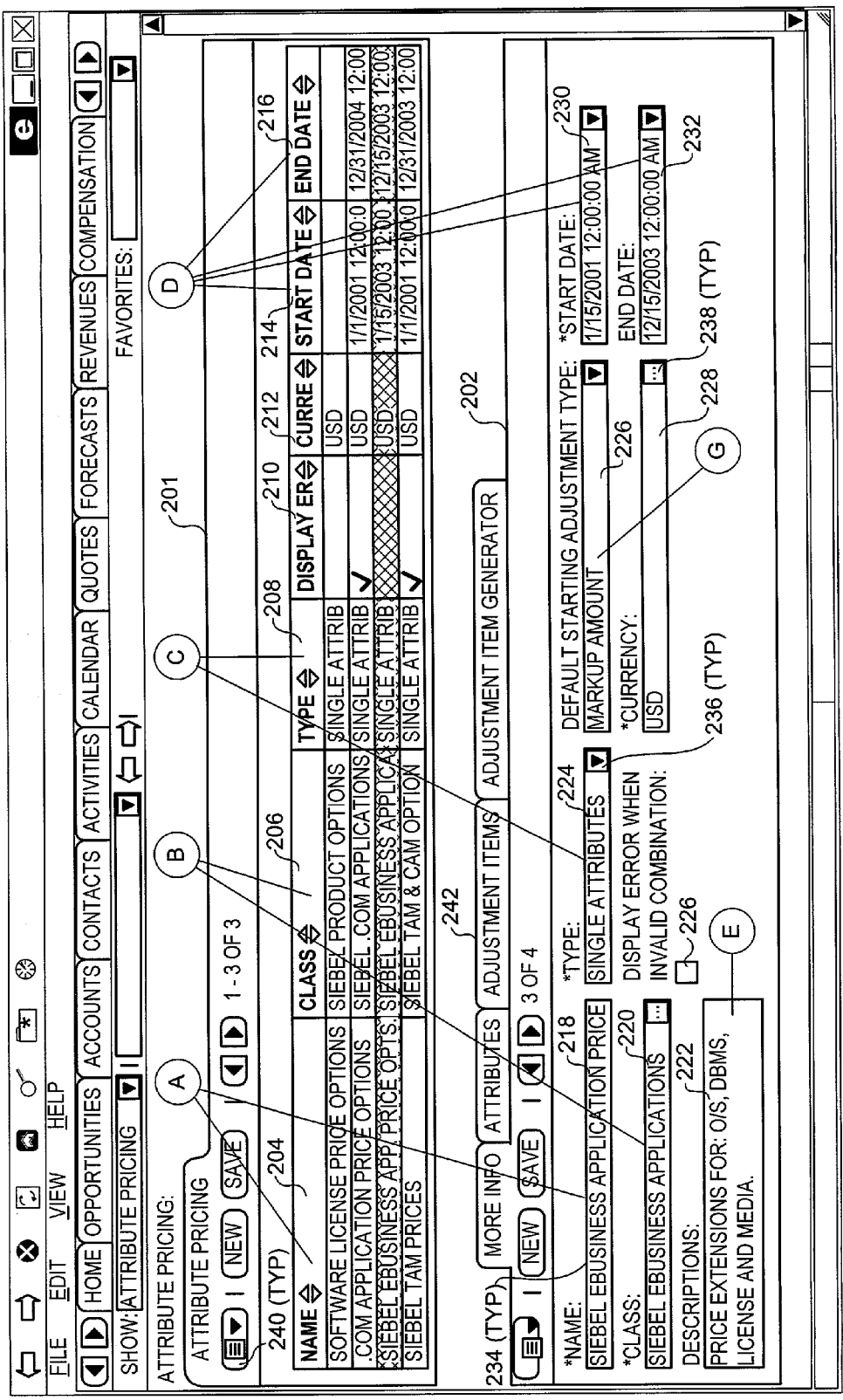
FIG. 6 is a representation of an exemplary user interface that enables users to define pricing attribute classes.

FIG. 6 depicts a attribute pricing view 200 that enables attribute pricing to be defined. The view includes an attribute pricing list form 201 and an attribute pricing detail form 202. In one embodiment, software for providing the functionality of each of the forms in FIGS. 6-10 comprises a respective applet, and the views are rendered on a browser. Accordingly, the terms "form" and "applet" may be used interchangeably in the following description. Optionally, the various forms and views may be generated uses either object-based programming languages, such as C++ and Java, or conventional programming languages, such as C and Visual Basic, using well-known user-interface programming techniques.

Attribute pricing list form 201 provides rows of data corresponding to various attribute pricing parameters in a list format that enables the parameters to be either entered directly into editable fields grouped by columns, including an attribute name column 204, an attribute class column 206, an attribute type column 208, a display error column 210, a currency column 212, a start data column 214 and an end data column 216. Upon selecting a row, or selecting a "NEW" button 217 (which will open a new blank row at the top of the list), users may enter data corresponding to these columns (and others not shown) using attribute pricing detail form 202. This form contains a set of editable fields corresponding to the columns of attribute pricing list form 201, including an attribute name field 218, an attribute class field 220, and attribute description field 222, an attribute type field 224, a display error checkbox 225, a default starting adjustment type field 226, a currency field 228, a start data field 230 and an end data field 232. Data corresponding to each of these fields may be entered via various types of edit control provided on the forms discussed herein, including edit boxes 234, dropdown controls 236, and browse selection controls 238. Activation of a dropdown control 236 allows a user to select a field value from a list of predetermined options corresponding to the field, while activation of a browse selection control launches a dialog including a selectable list of values, wherein the selectable list is populated with values based on current corresponding data in the database.

Each of the forms include a view selection control 240 that allows the user to navigate to a different view based on selection of the view form a list of views in a dropdown list that is displayed upon activation of the control. Another navigation technique is to select a form's tab. For example, selecting an "ADJUSTMENT ITEMS" tab 242 causes the view to change to an attribute adjustment view 244A shown in FIG. 7A. This view allows the user to set adjustments for each attribute value corresponding to attributes that are defined using the view of FIG. 6.

Attribute adjustment view 244A includes an instance of attribute pricing detail form 202, an adjustment item list form 246, and an adjustment item detail form 248. Adjustment item list form 246 contains a list of adjustment items pertaining to a current attribute as defined by the attribute parameters in attribute pricing detail form 202. Adjustment details of each of the attribute items in the list may be entered via editable fields in adjustment item detail form 248A, which include an extended attribute name column 250, an adjustment type column 252, and adjustment value column 254, and a description column 256. In one embodiment, the displayed column name for extended attribute name column 250 will be populated with the name of the currently selected adjustment item in adjustment item list form 246.

Figure 7A:
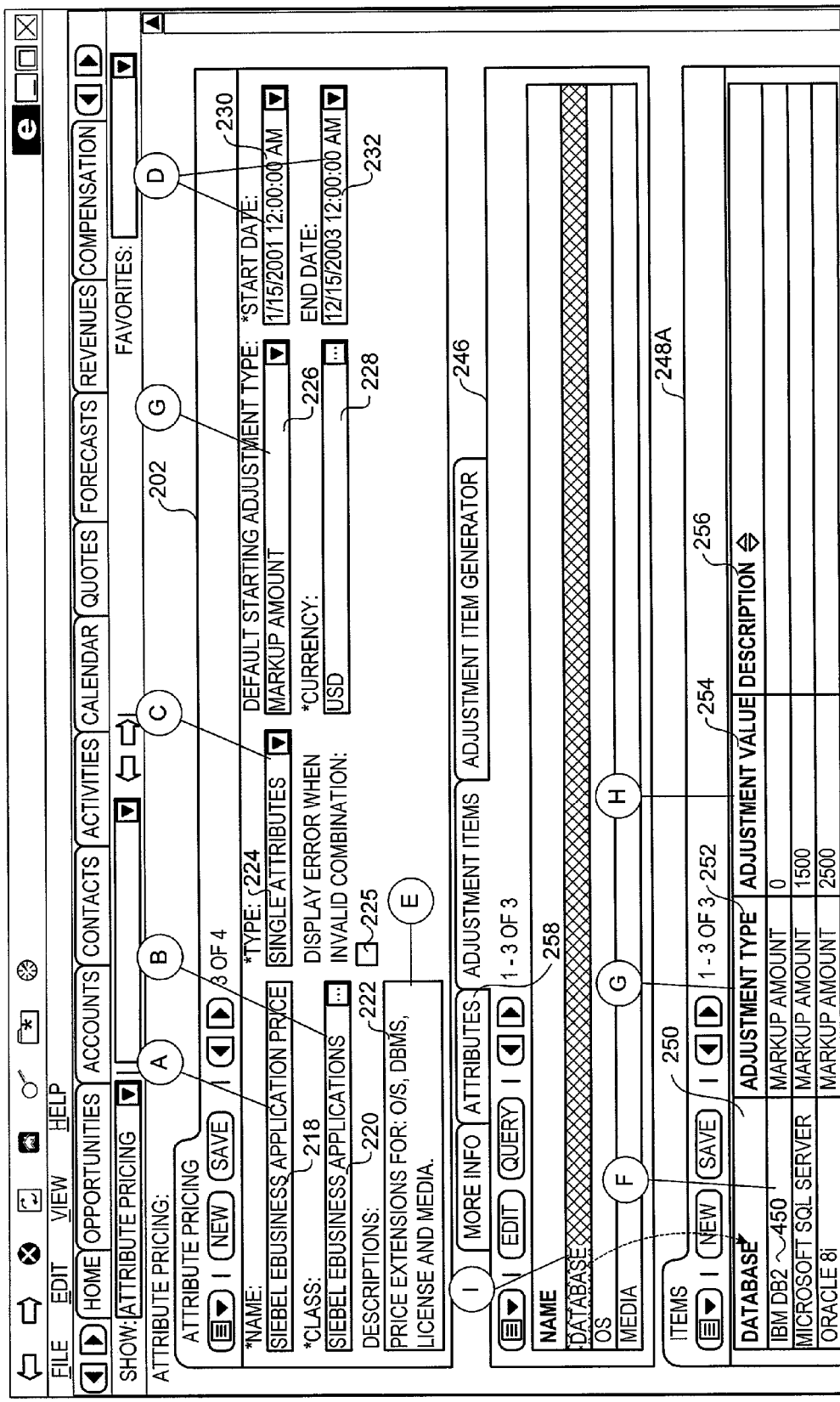
FIG. 7A is a representation of an exemplary user interface that enables users to define price adjustments for selected attributes having a single attribute type.
Figure 7B:
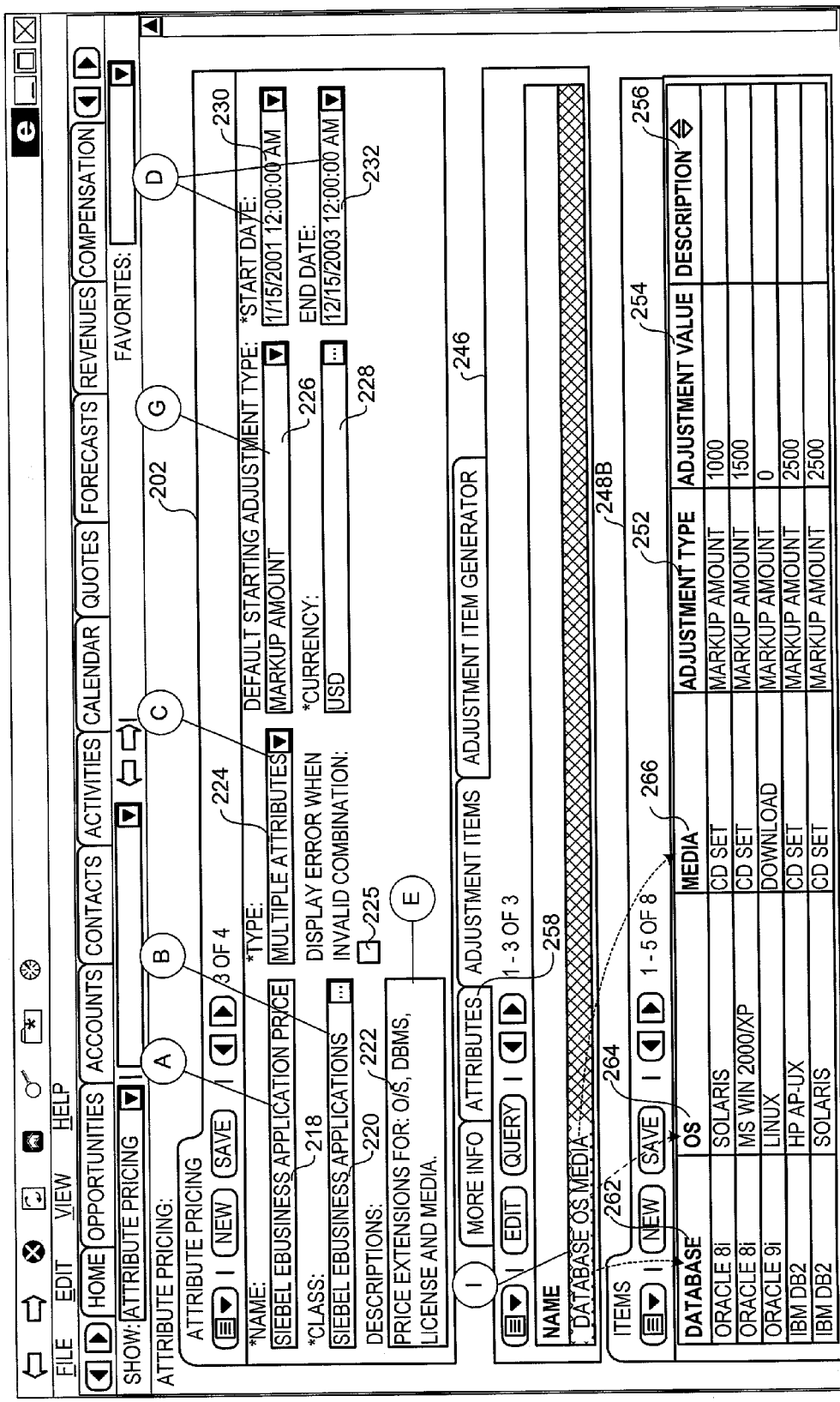
FIG. 7B is a representation of an exemplary user interface that enables users to define price adjustments for selected attributes having a multiple attribute type.
Figure 8A:
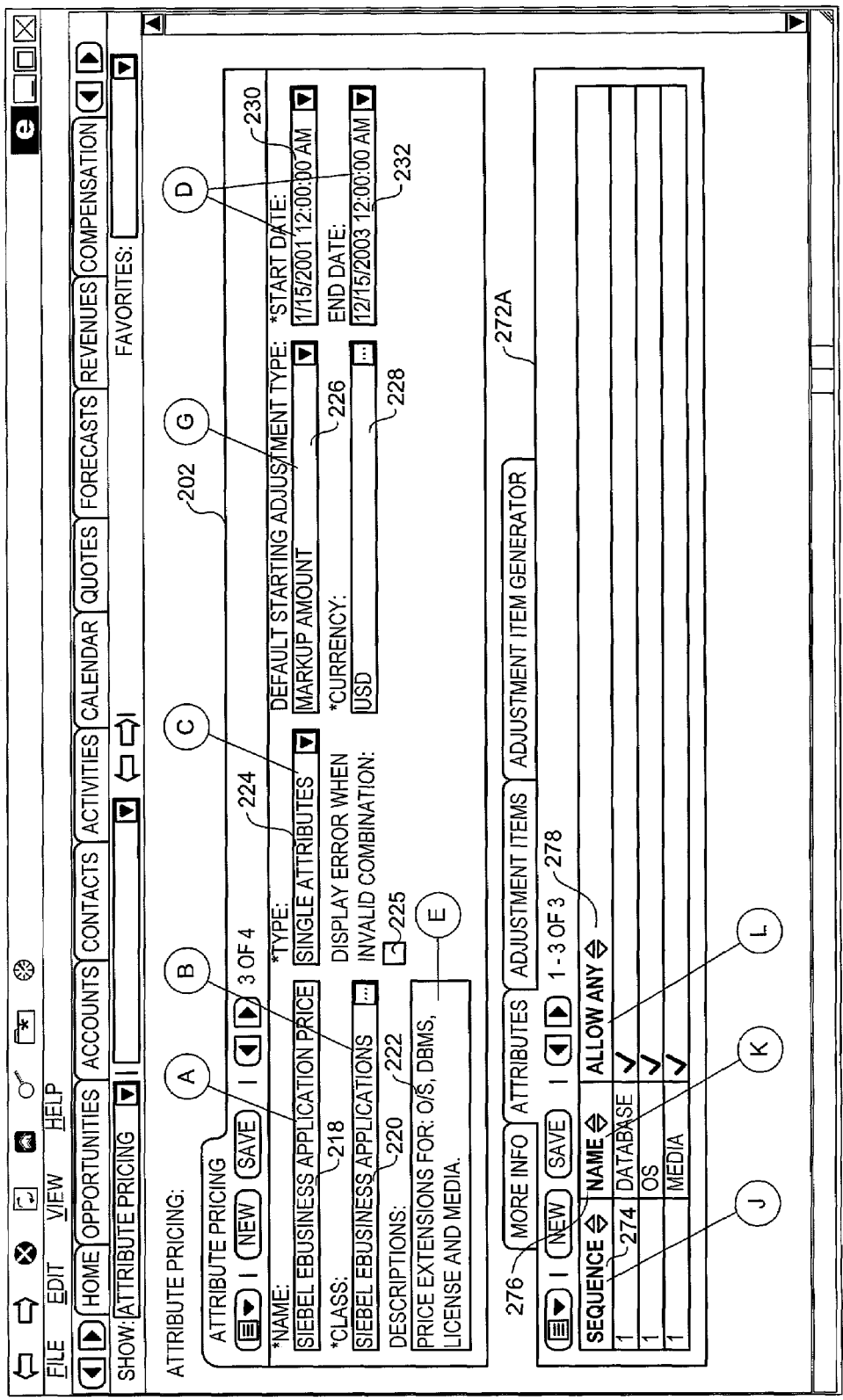
FIG. 8A is a representation of an exemplary user interface that enables users to define single attributes type attributes for selected products.
Figure 8B:
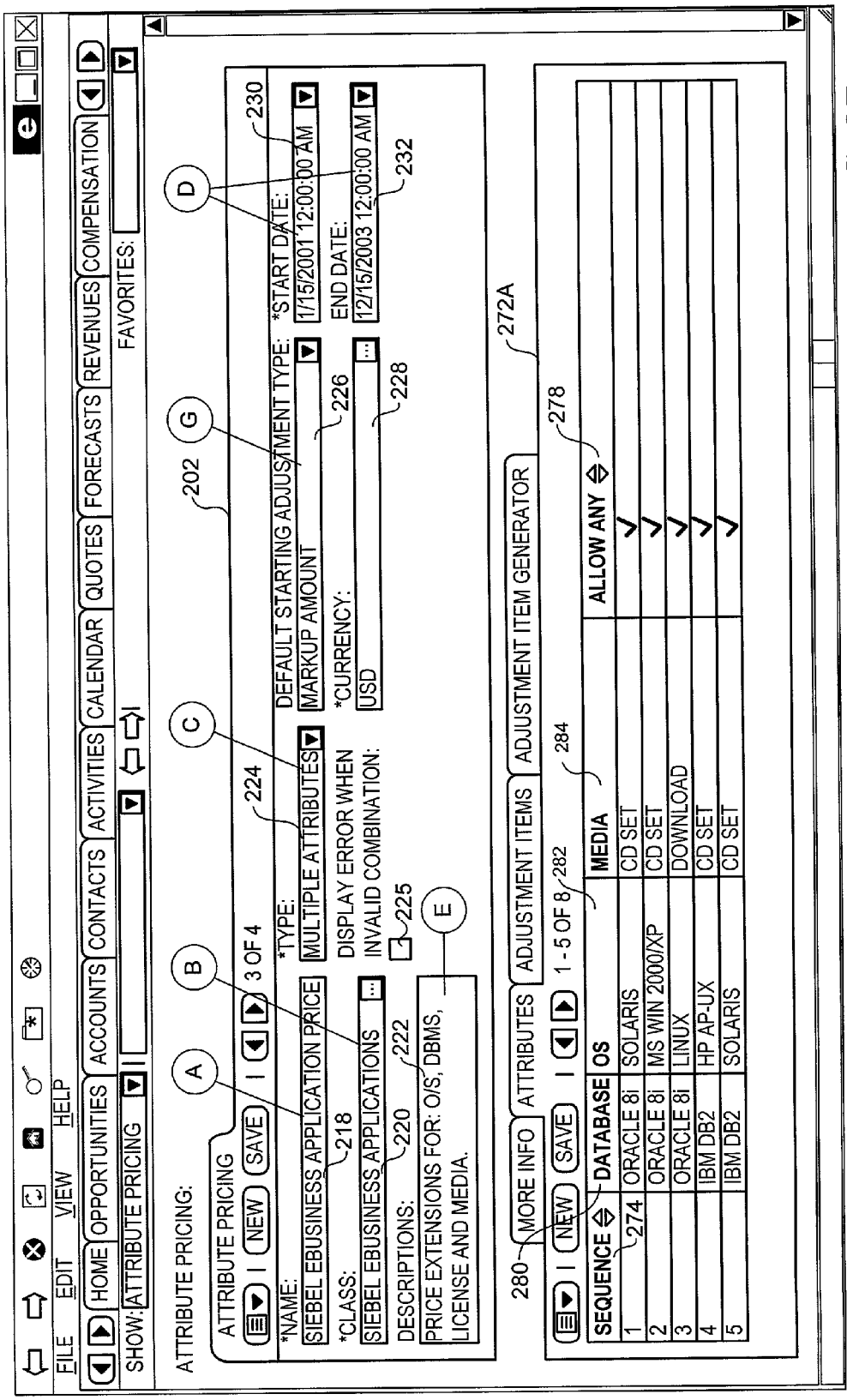
FIG. 8B is a representation of an exemplary user interface that enables users to define multiple attribute type attributes for selected products.

FIG. 7B shows an attribute adjustment view 244B corresponding to a situation in which the type of attributes corresponds to multiple attributes. In this instance, there is only a single row in adjustment items list form 246, wherein the value in the name column comprises a concatenation of the adjustment items that are members of the group, separated by commas. Accordingly, upon entry of this name, columns corresponding to respective portions of the name are added to the adjustment item detail form to create a new adjustment item detail form 248B. In this example, these columns include a "DATABASE" column 262, an "OS" column 264, and a "MEDIA" column 266. Each of these columns are filled with values corresponding to that column, so as to create a matrix of combinations, wherein each row in adjustment item detail form 248 comprises a unique combination of values. A pricing adjustment factor may then be supplied for each row by entering the value of the adjustment factor in adjustment value column 254.

Selection of an "ATTRIBUTES" tab 268 enables the user to navigate to an attribute selection view 270A, as shown in FIG. 8, which is used to define the attributes to be used to affect pricing, and the order the attribute groups are listed when multiple attributes are used. Attribute selection view 270A includes an instance of attribute pricing details form 202 and an attributes selection form 272A. When pertaining to single attributes, the attributes selection form displays attribute data in a row-wise tabulated list including a sequence column 274, a name column 276, and an allow any combination column 278.

As discussed above, attributes may be defined as single attributes, or multiple (i.e. grouped). With single attributes, each attribute is a member of its own group. Accordingly, each attribute is assigned a sequence value of "1." With multiple attributes, several attributes are assigned to the same group, whereby all attributes must apply to a specific product, and the attributes that make up the group may not be selected to be added individually. In the case of multiple attributes, a view 270B is generated (FIG. 8B), which includes an attributes selection form 272B that contains additional columns corresponding to the attributes defined for the group that replaces name column 276 in a manner similar to that discussed above for the adjustment item detail forms. Accordingly, in this example the new columns include a "DATABASE" column 280, an "OS" column 282, and a "MEDIA" column 284. Values entered into sequence column 274 now define the order the various group combinations appear in the various forms presented to the user. Furthermore, these numbers are used for storage purposes, wherein the sequence number is used to map the column the data are stored in, as described below.

Figure 9:
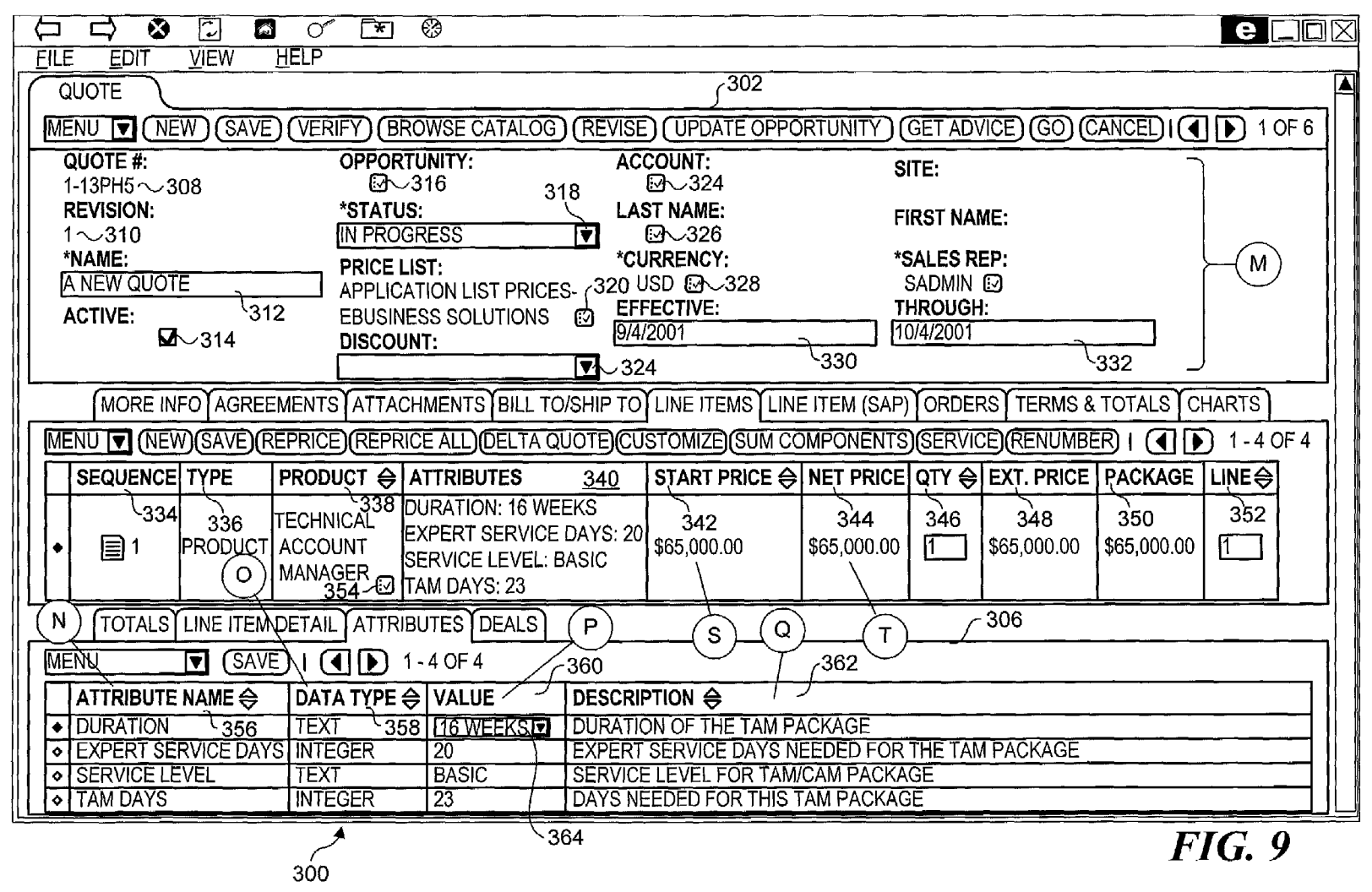

Another aspect of the invention enables users to define quotes that include products and selected attributes for those products. An exemplary quote view 300 is shown in FIG. 9, which includes a quote master form 302, a line items form 304, and an attribute details form 306. Quote master form 302 includes an automatically populated quote number 308, revision number 310, name edit box 312, and an active checkbox 314 that enables whether the quote is an active quote.

In one embodiment, the pricing system is integrated into a customer relationship management (CRM) system. Accordingly, an opportunity can be assigned to the quote via an opportunity dialog picklist control 316. Typically, each of the dialog picklist controls shown on the forms herein will, upon activation of the control's icon, launch a dialog that is filled with a list of options from which the user can pick, wherein the options are determined at run-time through query of the database for data corresponding to the control. For example, activation of opportunity dialog picklist control 316 will launch a dialog containing a list of applicable opportunities a user may assign to the quote.

Quote form 302 further includes a status dropdown control 318, a pricelist dialog picklist control 320, a discount dropdown control 322, and account, last name, and currency dialog picklist controls 324, 326, and 328. The effective date range for the quote may be entered via a start date edit box 330 and an end date edit box 332.

Line items form 304 displays a list of product and related attribute details for each product that has been added to the quote. The line item from includes a sequence column 334, a type column 336, a product column 338, a product number column (not shown), an attributes column 340, a start price column 342, a net price column 344, a quantity column 346, and extended price column 348, a package column 350, and a line item number column 352.

Upon selection of a product via a product dialog picklist control 354, the various columns of attributes form 306 are populated with attribute related data pertaining to the product as defined previously through the various forms shown in FIGS. 6, 7A, 7B, 8A, and 8B. These columns include an attribute name column 256, a data type column 358, a value column 360, and a description column 362. The user is enabled to change the value of a particular attribute by clicking on it corresponding field, which will typically change the field to a dropdown control that is populated with various optional values as defined in LST_OF_VAL table 46 based on the LOV_TYPE_CD value defined for the attribute in XA_ATTR table 44. For example, clicking on the topmost field in value column 360 will switch the field to a dropdown control 364 containing a list of values pertaining to legal duration values. In cases in which the value pertains to an integer, a range of values may be defined rather than a list, thereby reducing the number of records to define legal values for the attribute.

Figure 10:
FIG. 10 is a representation of an exemplary user interface that enables users to see further attribute details when preparing a quote.
Figure 11A:
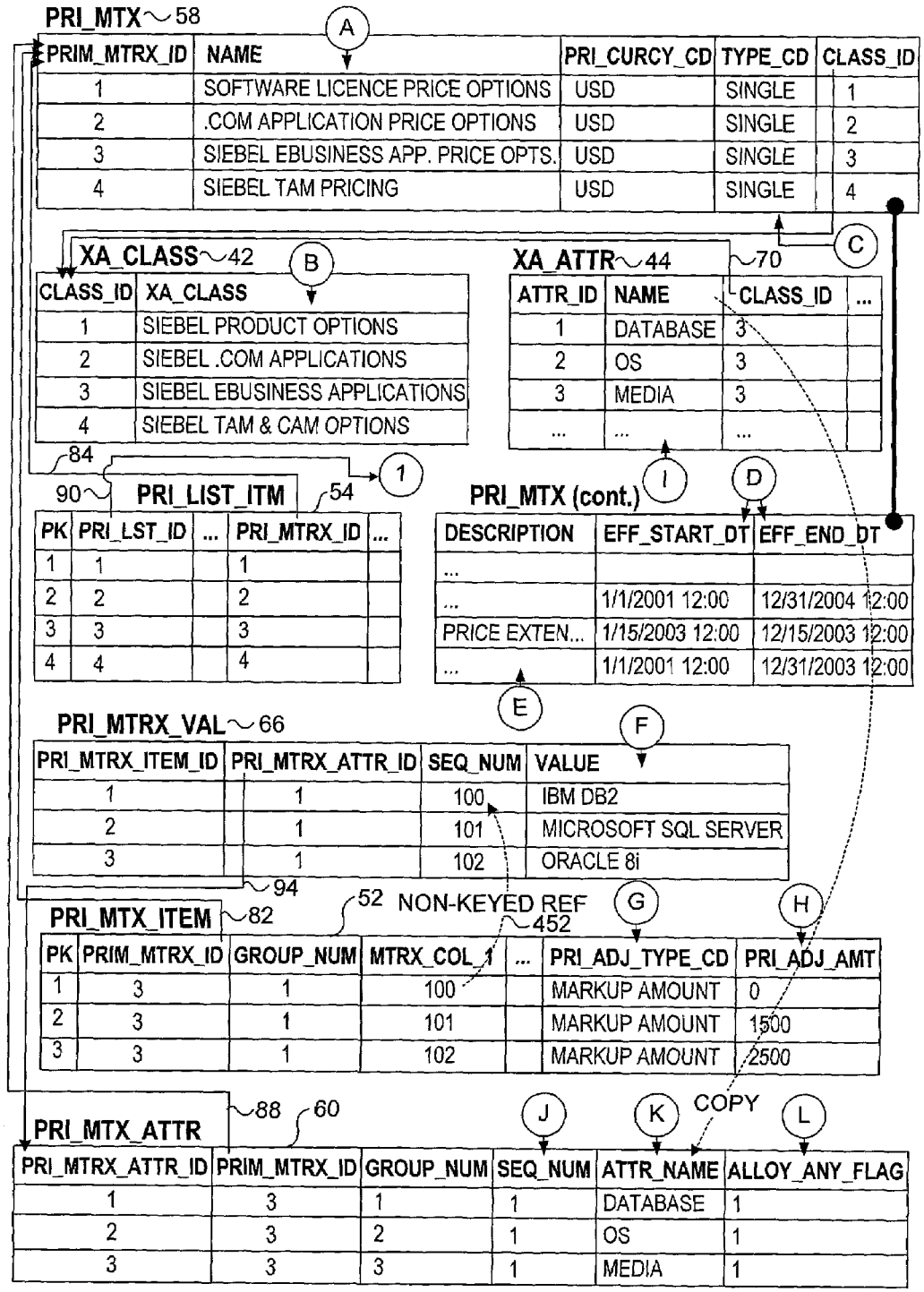
FIGS. 11A and 11B show various database tables corresponding to the physical database model of FIGS. 2 and 5 populated with data corresponding to the user interface representations of FIGS. 6, 7A, 7B, 8A, 8B, 9 and 10.
Figure 11B:
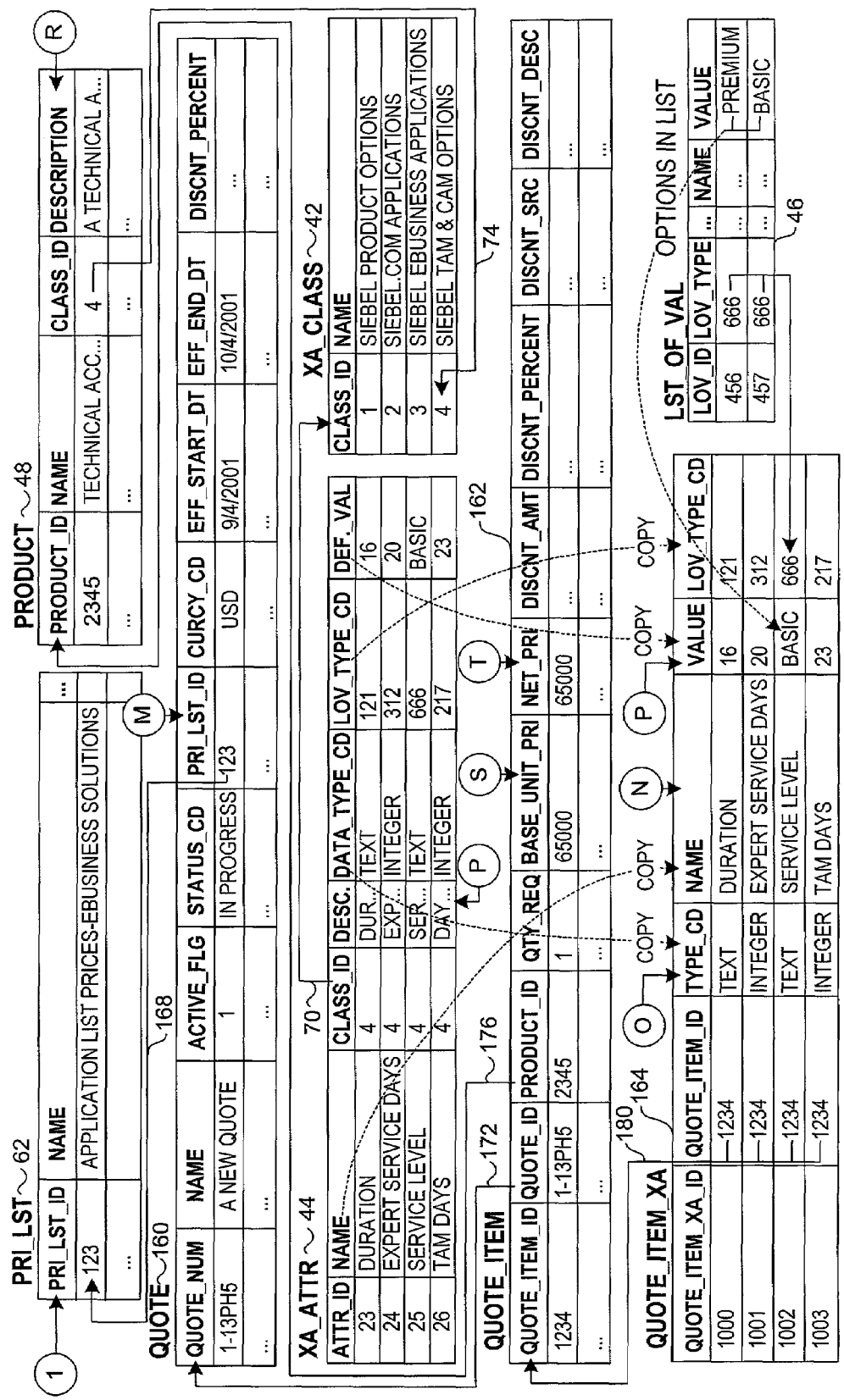

A product detail view 370 corresponding to a shopping cart model implementation is shown in FIG. 10. In one embodiment, product detail view 370 includes a product detail window 372, an attributes form 374, a shopping cart summary window 376, and a quick add form 378. Details of the product are shown in product detail window 372, including a name 380, a description 382, a list price 384, a net price 386, and a quantity edit box 388. In one embodiment, the window further includes a manufacturer code 390 and an item code 392.

Attributes form 374 provides another way for users to select attribute values for a product. In a manner similar to that discussed above, attributes form 374 will be populated with various information pertaining to attributes that are defined for the product. Additionally, the values for attributes that have values defined by a list of values may be selected via a dropdown control, such as dropdown controls 394 and 396. In one embodiment, the list of values will contain both a name and a price modifier, such as shown in a dropdown list 398.

Software Architecture

In one embodiment, software corresponding to a system in which the teachings of the present invention are implemented can be logically structured as a multi-layered architecture 400, as shown in FIG. 12. In one embodiment, the logical multi-layered architecture provides a platform for common services 402 to support various applications that implement the architecture. These services may include a user interface layer 404, an object manager layer 406, a data manager layer 408, and a data exchange layer 410.

In one embodiment, user interface layer 404 may provide the applets and views described herein. Generally, user interface layer 404 may be configured to support various types of clients, including traditional connected clients, remote clients, thin clients over an Intranet, Java thin clients or non-Windows-based operating systems, and HTML clients over the Internet, etc.

Object manager layer 406 is designed to manage one or more sets of business rules or business concepts associated with one or more applications and to provide the interface between user interface layer 404 and data manager layer 408. In one embodiment, the business rules or concepts can be represented as business objects. In one embodiment, the business objects may be designed as configurable software representations of the various business rules or concepts applicable to the data services provided by the embodiments of the invention, such as the pricing engine services.

Data manager layer 408 is designed to maintain logical views of underlying data stored in one or more databases 412 corresponding to a data storage layer 414, while allowing the object manager to function independently of the underlying data structures or tables in which data are stored. In one embodiment, the data manager provides certain database query functions, such as generation of structure query language (SQL) in real time to access the data. In one embodiment, data manager 408 is designed to operate on object definitions 416 stored in a repository file 418 corresponding to a database schema used to implement that data model for the system, as described in further detail below. Generally, the data exchange layer is designed to handle the interactions with one or more specific target databases and provide the interface between the data manager and those databases, via either generic (e.g., Open Database Connectivity (ODBC)) or native (e.g., Oracle Connection Interface (OCI)) database interface protocols.

FIG. 13 shows a block diagram illustrating another logical representation of a multi-layered architecture in which applications can be built in accordance with one embodiment of the invention. Again, the multi-layered architecture as illustrated in FIG. 13 provides the platform for various common services designed and configured to support the various operations provided by the embodiments of the invention discussed herein. In one embodiment, these various services include a presentation services layer 420 corresponding to services provided by an applet manager and user interface 422, an application services layer 424 corresponding to services provided by object manager layer 406 and data manager layer 408, and a data services layer 426 corresponding to services provided by database 412.

In one embodiment, presentation services 420 may be designed and configured to support various types of clients and may provide them with user interface applets and views. In one embodiment, application services 424 may include business logic services and database interaction services. In one embodiment, business logic services provide the class and behaviors of business objects and business components implemented by the application services. In one embodiment, database interaction services may be designed and configured to take the user interface (UI) request for data from a business component and generate the appropriate database commands (e.g., SQL queries, etc.) to satisfy the request. For example, the data interaction services may be used to translate a call for data into RDBMS-specific SQL statements.

A multi-layer architecture illustrating the relationships between business objects, business components, and database tables is shown in FIG. 14. A business object 430 sitting at the top layer passes various data access requests to business components 432, 434, and 436 to retrieve data pertaining to the business object from a database 438. For example, business object 430 may pertain to an opportunity object and business components 432, 434, and 436 are used to access data in database 438 pertaining to opportunities.

In one aspect, business components are objects that span data from one or more physical database tables and calculated values by referencing a base table and explicitly joining and linking other tables, including intersection tables, as depicted by tables 440, each of which include a plurality of records 442. As explained in further detail below, each business component contains information for mapping to various data stored in those tables. More specifically, these mappings are between a requested object, such as a subject, and information pertaining to that object that are stored in the database table(s) to which the business component corresponds. In one embodiment, database schema information stored in a repository file 444 is used by the business components in determining their table mappings.

A block diagram of a logical structure of a business component in accordance with one embodiment of the present invention is shown in FIG. 15. Each business component (e.g., 432, 434, 436) may include a set of properties 445 that pertain to the respective business component (e.g., NAME, which specifies the logical name of the business component, TABLE NAME, which specifies the actual name of the underlying table, etc.). A business component also includes a set of fields 246, each of which may have a set of associated attributes or properties 448. For example, a field may include a NAME property that identifies the name of the field, a COLUMN NAME property that identifies the column of the underlying table to which the respective field is mapped, etc.

In one aspect, the use of multi-layer architecture 400 enables various data to be retrieved from an underlying database and stored in various data structures corresponding to appropriately configured business components, wherein further accesses to the data only require retrieving the data from the data structures rather than re-querying the database every time data needs to be retrieved. This improves the response time of applications implementing the architecture, while reducing network traffic and database workload.

For example, in one embodiment an applet that generates items forms 248A and 248B uses memory data structures to temporarily hold and manipulate database data. As discussed above the PRI_MTRX_ITEM table has fields MTRX_COL_1, MTRX_COL_2, etc., that store the sequence numbers for corresponding attribute values. When a corresponding business component is first created, it loads data from the PRI_MTRX, PRI_MTRX_ATTR, and PRI_MTRX_VAL tables for the current PRI_MTRX (e.g., the PRI_MTRX corresponding to the data contained in attribute pricing form 202 in FIG. 7A).

An exemplary data structure for each attribute is as follows:

```
PriceBookAttribute
{
    String      name;              // name of attribute
                                   // (from PRI_MTX_ATTR.ATTR_NAME)
    int         group;             // group this attribute belongs to
                                   // (from PRI_MTX_ATTR.GROUP_NUM)
    int         sequence;          // sequence number in its group
                                   // (from PRI_MTX_ATTR.SEQ_NUM)
    MapStringToInt  mapValueToSequence;   // object that holds
                                   // lookup map of attribute
                                   // value to sequence number
    MapIntToString  mapSequenceToValue;   // object that holds
                                   // the reverse map of above
                                   // for fast lookup both ways
};
```

In addition, a mapping shown below is used to map the attribute name to the price book attribute data structure:

```
MapStringToObject   mapNameToAttr; // lookup map for getting
                                   //Price Book Attribute structure
                                   //from its name
```

From this mapping, the data structure can quickly be retrieved given the name of the attribute using the map.

With reference to FIG. 7A, when a user selects a row 450 corresponding to a "DATABASE" attribute, a notification is sent from adjustment items applet 246 to adjustment items detail applet 248 that the user has moved to a new row and a request is made by adjustment items detail applet 248 to a Price Book Items business component to retrieve data to populate the various fields in its corresponding form (i.e., items details forms 248A and 248B). At the same time various data corresponding to the Database attribute is retrieved from the database and stored in PriceBookAttribute data structures based on values in the PRIM_MTRX_ID, GROUP_NUM and SEQ_NUM columns of PRI_MTX_ATTR table 60 corresponding to the "DATABASE" attribute.

For example, as shown in FIG. 11A, the first row of PRI_MTX_ATTR table 60 corresponds to the "DATABASE" attribute (stored in the ATTR_NAME column), including a PRIM_MTRX_ID value of 3, a GROUP_NUM of 1, and a SEQ_NUM of 1, indicating that the attribute is a single attribute. The values corresponding to extended attribute name column 250, adjustment type column 252, adjustment value column 254 and description column 256 are retrieved from the database using a query that uses one-to-many relationships 88 and 94, and business logic corresponding to a non-keyed reference 452 (FIG. 11A). For example, the SQL query might look like:

```
Select    VALUE, PMI_ADJ_TYPE_CD, PRI_ADJ_AMT,
          PMA.GROUP_NUM, PMA.SEQ_NUM
From      PRI_MTX_ATTR PMA, PRI_MTX_ITEM PMI,
          PRIM_MTRX_VAL PMV, PRI_MTX_PM
Where     PMA.PRIM_MTRX_ID = PM.PRIM_MTRX_ID and
          PMI.PRIM_MTRX_ID = PM.PRIM_MTRX_ID and
          PMA.PRIM_MTRX_ID = 3 and
          PMA.ATTR_NAME = 'DATABASE' and
          PMV.PRI_MTRX_ATTR_ID =
```

-continued

```
PMA.PRI_MTRX_ATTR_ID and
PMV.SEQ_NUM = PMI.MTRX_COL_1;
```

A portion of the returned values are stored in a PriceBookAttribute data structure by the Price Book Items business component, as follows:

```
{
    DATABASE;                    // name
    1;                           // group
    1;                           // sequence
    (100:IBM DB2,                // mapValueToSequence object
    101:Microsoft SQL Server,
    102:Oracle 8i)
    (IBM DB2:100,                // mapSequencetoValue object
    Microsoft SQL Server:101,
    Oracle 8i:102)
}
```

The Price Book Items business component then returns field identifier:value pairs to adjustment items detail applet 248 for display on the form.

A similar process occurs when a value is saved to a column. For example, in order to specify the value of "IBM DB2" for one of the database extended attributes from which a user could select for the DATABASE attribute, in one embodiment a user would select the value of "IBM DB2" from a list in dropdown combo box (not shown). In this instance, the various options for the list will have been entered during an earlier administrative process and stored in the database. Upon selecting the "IBM DB2" option, adjustment items detail applet 248 would pass data identifying the selected option to the Price Book Items business component and request that the data identifying the selection be saved to the database. Typically, the information passed would a sequence number corresponding to the value and an identifier specifying to the form column the value corresponds to (in this case an identifier for extended attribute name column 250, which in one embodiment simply comprises a column sequence number of "1" corresponding to the column order on the form). The Price Book Items business component would then lookup the sequence number using mapValueToSequence and save the sequence number 100 in the MTRX_COL_1 column of PRI_MTX_ITEM table 52.

By preloading data in this manner, the data displayed by various UI objects can be modified without requiring a database access for each modification, thereby improving performance. When a user highlights a different row in Adjustment Items applet 246 (e.g., the "OS" row or the "MEDIA" row, the process for retrieving the corresponding data for display in the fields of adjustment items detail applet 258 is repeated, using the new GROUP_NUM value corresponding to the selected row.

In attribute adjustment views 244A and 244A, attribute pricing applet 202 corresponds to a price book, while rows contains in adjustment items applet 246 represents all of the groups in that price book, and the data in adjustment items details applet 248 represents that actual adjustment items for each group. Since the number of attributes for a given group and the type of attributes (single or multiple) may change depending on the group, the number of columns and rows in adjustment items detail applet 248 are not known until runtime. Also, the dropdown values for each column will also change, depending on the underlying options for those columns. For example, compare adjustment items detail forms 248A and 248B in FIGS. 7A and 7B, respectively. In order to support these configurations, adjustment items details applet 248 comprises a dynamic list applet.

In the end-user views (e.g. product detail view 370), the attributes for a product are also displayed using dynamic form applets. The business component used by these applets is a virtual business component. This means that it is not directly mapped to a table. Instead, it still has fields that the applet can access but the values for the fields are generated through code by accessing various data sources.

In this case, the business component preloads data from XA_CLASS table 42, XA_ATTR table 44, and LST_OF_VAL table 46 and generates the control labels. In a similar manner to that discussed above, the applet will get the list of attributes available from the business component and use them to generate the UI (such as control labels). The list of values selectable for each attribute is also generated from the preloaded data.

In this UI, if the product has an associated PRI_MTRX in PRI_LST_ITEM, and the price book (PRI_MTRX) is of the special type Single Attributes (which means each attribute is in its own group), then the price difference for selecting attribute values will be displayed in a drop-down list, such as the values in drop-down list 396 in FIG. 10. The business component generates the list of values for the UI and it does so by querying for all the possible adjustments in PRI_MTRX_ITEM table 52 and calculating the price difference for selecting different values based on the current selection.

For any other case, including multiple attributes (where all attributes are in one group), there will be a "Pricing Detail" button in the attributes form applet for each group, such as a PRICING DETAIL button 460 in a quote view 462 shown in FIG. 12. Activation of this button will display a popup list applet that will show the combination of attribute values and the price adjustment for selecting each combination of attributes to the end-user, such as depicted by popup list applet 464. Basically, the applet displays the PRI_MTRX_ITEMS records for that group, with the further addition of a Price Difference column 466. Based on the current set of selected attributes and the base price of the product, the business component will calculate the price difference for selecting the various different combinations.

The selected attribute values are stored in memory only by the business component. When the user selects an "Add to Cart" button 468, the business component submits an SQL query to the database to create a quote line item record in QUOTE_ITEM table 162 and create quote item extended attribute records in QUOTE_ITEM_XA table 164 with the selected values.

Mapping Products and Quotes to Matrix-Based Pricing Factors

As discussed above with reference to FIG. 3, embodiments of the invention enable matrix-based pricing factors to be defined in one or more tables (e.g., tables 30A, 30B, and 30C) and referenced through a matrix search specification 130 to enable the pricing factors used in one or more pricing models 126, which in turn may be used in one or more price lists 62. In order to implement that matrix-based pricing factors, there needs to be a mechanism to link matrix rows in the matrix tables to actual products and/or quotes in the pricing system. In one embodiment, this linking is enabled through data stored in PRIMDL_FCTR table 128 that identifies one or more appropriately configured business components that enable products and quotes to be priced using the matrix-based pricing factors.

In one embodiment, this information may be entered by a user via a pricing factor view 470 shown in FIG. 17. This view includes a pricing model details applet 472, a pricing factor design applet 474, and a price factors detail applet 476. The name of the pricing model in which the pricing factors will be implemented in entered in an edit box 218. A customizable product may be selected via activation of a dialog picklist control 480, while an optional description may be entered via an edit box 482. A customizable product is a product with a hierarchy, meaning that a product can have multiple levels of child products, and can also be customized through the product configurator. The user can launch the product configurator to modify add or remove child products.

In order to ensure the integrity of pricing models, a locking mechanism is provided that enables only one user to change a given pricing model at one time, as discussed above. To activate the locking mechanism, the user selects a locked checkbox 484, which will cause a user ID corresponding to the user who locked the pricing model to appear in a text box 486 and a time and data that the model was locked to appear in a text box 488. The user may also specify a currently via selection of a dialog picklist control 490, enter a required start data that defines the data that the model will come into effect via a combo edit control 492, and an optional end date defining when the model is to expire via a combo edit control 494.

Pricing factor design applet 474 displays tabulated data in pertaining to various price factor types, including single, matrix-based, and bundling price factors. The various columns on this applet include a sequence column 496 that is used to define the order in which pricing factors are applied, a name column 496 in which the name of the pricing factor is entered, and a type column 500 in which the type of price factor is entered or selected via a pulldown control (not shown). In addition, start and end date columns 502 and 504 are respectively used to display starting and end date values for each pricing factor.

Price factor details applet 476 provides various fields that enable users to enter or select various details pertaining to a selected pricing factor in pricing factor design applet 474 to define the behavior of the pricing factor. These fields include a name edit box 506 in which the name of the pricing factor is entered if new or displayed if previously defined, a dialog picklist control 508 via which a user can select a next pricing factor to apply if the search condition is true, and an edit box 510 in which comments concerning the price factor may be entered. A dialog picklist control 510 enables a user to select a business object to which the pricing matrix corresponds from a list of previously build business objects. If the search condition is false (i.e., there are not objects that meet the search criteria, another pricing factor to apply may be selected via a dialog picklist control 514.

The business component used by the pricing factor is selected via a dialog picklist control 516. As explained in further detail below, this business component forms a link between a price model and various pricing factors that may be defined in one or more user tables that are not a part of the main database schema for the dynamic pricing system (i.e., the schemas shown in FIGS. 2 and 5). A target price for the product or quote may be selected via a pulldown control 518.

In one embodiment, a matrix search specification is used to specify under what circumstances the pricing information linked via the business component is to be applied. This specification may be defined in a multi-line edit box 520. For example, in FIGS. 17 and 18, a matrix search specification 522 of "[Product Name]={quote.Product Name} AND [Agreement Id]={Quote.Agreement Id}. The search specification says to look for records in the FS Product Price Item Details business component for which the specified condition is true. The values for Quote.Product Name and Quote.Agreement Id are retrieved from the current quote and substituted in. When a record meeting this criteria is found, the system reads the Adjustment Type and Adjustment Value columns and applies the adjustment accordingly. The applet further includes a checkbox 524 for marking the price factor as active.

Details of where various data corresponding to pricing factor view 470 are shown in FIG. 18. Data entered via pricing model applet 472 is stored in PRI_MDL table 126, while data entered via price factor detail applet 476 is stored in PRIM-DL_FCTR table 128. This latter table stores the business component name 526 entered in edit box 516 in MATRIX_BC_NAME column 156 and matrix search specification 522 in MATRIX_BC_SEARCHSPEC column 158. These data are provided as inputs to a FS product price item detail business component 528, which includes business logic 530 for mapping virtual columns specified in matrix search specification 522 with physical columns in a user-defined MATRIX_ADJUSTMENT table 532 containing various price adjustments that are based on a combination of factors.

As discussed above, users are able to define matrix tables defining conditions in which a price adjustment is defined for a combination of conditions defined by the columns of the matrix table. For example, MATRIX_ADJUSTMENT table 522 includes two condition columns, including a Customer_Name column 534 and Product_Name column 536. The pricing adjustment that is applied for the conditions is each row in the table are specified in an adjustment column 538. Business logic 530 defines mappings between virtual columns specified in the matrix search specification to actual (physical columns in MATRIX_ADJUSTMENT table 522. For example, Agreement ID values are mapped to customer name values in Customer_Name column 534, while Product Name values are mapped to products contained in Product_Name column 536.

In accordance with the present example, a pricing adjustment would work as follows. Suppose that an end-user prepares a quote for Compaq, and the quote includes various computer hardware, including a bulk lot of 40 gigabyte SCSI-3 hard drives. Further suppose that the bulk lot has a list price of $1000, which normally would be the price charged. However, as specified by a row 540 in MATRIX_ADJUSTMENT table 532, Compaq is to receive a discount of 2% (corresponding to the 98% adjustment value) when it purchases 40 gigabyte SCSI-3 hard drives. Thus, the price charged to Compaq would be 98%×$1000=$980.

Distributed Physical Architecture to Implement Multi-Layer Software Architecture A distributed physical architecture 550 corresponding to one embodiment of the invention is shown in FIG. 19. Architecture 550 comprises a well-known n-tier architecture that distributes the various software components that implement the operations of the embodiments of the invention across computer systems disposed at various tiers or layers within the architecture. For example, software corresponding to user interface layer 422, including the applets discussed above, will typically be run on one or more client machines 552 corresponding to a client tier, wherein each of the client machines is connected to one or more application servers 554 corresponding to an application server tier via a computer network 556, such as a local area network (LAN), wide area network (WAN) or the Internet. In one embodiment, the various UI objects are enabled through the use of a browser running on client machines 552. In another embodiment, well-known user interface techniques may be used, such as using UI objects that are built on Microsoft Windows objects (e.g., through use of C++ Microsoft Foundation Classes). In cases where computer network 556 is the Internet, a web server tier comprising one or more web servers may sit between the client and application server tiers (not shown).

The majority of the business logic to implement the embodiments of the invention is provided by "middleware" software that runs on one or more application servers 554, including software components corresponding to object manager 406, which includes the business objects and business components used to implement one embodiment of the invention, as well as data manager 408, which provides access to the data storage aspects of the system, as described above. The software running in the application server tier is sometimes called "middleware." The data for the system is stored in an RDBMS (relational database management system) database 558 hosted by a database server 560 that is connected to the application server tier via a LAN 562. Typically, RDBMS database 558 will correspond to a SQL RDBMS database provided by Oracle (Oracle 8i and 9i), Microsoft (SQL Server 7 or 2000), IBM (DB2), Informix, or Sybase. Non-SQL based database may also be used. RDBMS database includes data that are stored in the various tables discussed above with reference to the physical database model diagrams 40A and 40B of FIGS. 2 and 5, along with RDBMS metadata 564 that is used to define the structure of the tables, relationships, indexes, views, etc. used in a database schema corresponding to the physical database model diagrams. The RDBMS database further includes the user-defined matrix tables that are used for the matrix-based price adjustments.

Exemplary Computer System for Use as Clients and Servers in System

With reference to FIG. 20, a generally conventional computer 600 is illustrated, which is suitable for use as client machines, application servers, and database servers in connection with practicing the embodiments of the invention, and may be used for running client and server-side software comprising one or more software modules that implement the various operations of the embodiments of the invention discussed above. Examples of computers that may be suitable for client machines as discussed above include PC-class systems operating the Windows NT or Windows 2000 operating systems, Sun workstations operating the UNIX-based Solaris operating system, and various computer architectures that implement LINUX operating systems. Computer 600 is also intended to encompass various server architectures, as well as computers having multiple processors.

Computer 600 includes a processor chassis 602 in which are mounted a floppy disk drive 604, a hard drive 606, a motherboard 608 populated with appropriate integrated circuits including memory 610 and one or more processors (CPUs) 612, and a power supply (not shown), as are generally well known to those of ordinary skill in the art. It will be understood that hard drive 606 may comprise a single unit, or multiple hard drives, and may optionally reside outside of computer 600. A monitor 614 is included for displaying graphics and text generated by software programs and program modules that are run by the computer. A mouse 616 (or other pointing device) may be connected to a serial port (or to a bus port or USB port) on the rear of processor chassis 602, and signals from mouse 616 are conveyed to the motherboard to control a cursor on the display and to select text, menu options, and graphic components displayed on monitor 614 by software programs and modules executing on the computer. In addition, a keyboard 618 is coupled to the motherboard for user entry of text and commands that affect the running of software programs executing on the computer. Computer 600 also includes a network interface card 620 or built-in network adapter for connecting the computer to a computer network, such as a local area network, wide area network, or the Internet.

Computer 600 may also optionally include a compact disk-read only memory (CD-ROM) drive 622 into which a CD-ROM disk may be inserted so that executable files and data on the disk can be read for transfer into the memory and/or into storage on hard drive 606 of computer 600. Other mass memory storage devices such as an optical recorded medium or DVD drive may be included. The machine instructions comprising the software that causes the CPU to implement the operations of the embodiments of the invention that have been discussed above will likely be distributed on floppy disks or CD-ROMs (or other memory media) and stored in the hard drive until loaded into random access memory (RAM) for execution by the CPU. Optionally, all or a portion of the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A computer-implemented method for dynamically pricing a sellable object, comprising:
   providing a first user interface to allow a user to define the sellable object, wherein the sellable object comprises a product selected by the user from a list of products;
   providing a second user interface to allow the user to selectively add an extended attribute to the selected product;
   determining a static price for the sellable object as a function of a base price for the selected product and a base price for the selected, extended attribute;
   determining pricing factors, wherein the pricing factors include a plurality of matrix-based pricing factors that are stored as a plurality of rows in at least one table, that are applicable to the sellable object based on the selected, extended attribute;
   generating a dynamic price by adjusting the static price for the sellable object based on the pricing factors determined to be applicable to the sellable object;
   identifying a search criteria based on attributes of the sellable object;
   generating a query identifying the at least one table to search using the search criteria; and
   executing the query against a database in which the at least one table is stored.

2. The method of claim 1, further comprising:
   providing a third user interface by which any user may define a price book comprising data identifying products in the price book and pricing information corresponding to those products.

3. The method of claim 2, further comprising:
   providing a fourth user interface by which any user may define extended attributes pertaining to products in the price book and pricing information corresponding to those extended attributes.

4. The method of claim 1, further comprising:
defining a plurality of extended attribute classes, each extended attribute class including at least one extended attribute; and
associating extended attribute classes with products, wherein each product to which an extended attribute class is associated inherits the extended attributes defined for the respective extended attribute class.

5. The method of claim 1, wherein base prices for the selected product and the selected, extended attribute are defined using a first currency, the method further comprising:
enabling any user to select a second currency;
calculating an exchange rate between the first and second currencies; and
multiplying the dynamic price of the sellable object by the exchange rate.

6. The method of claim 1, further comprising creating a plurality of price lists, each price list comprising base prices corresponding to at least a subset of products in the list of products.

7. The method of claim 6, wherein at least one of said plurality of price lists contains pricing information corresponding to a customer.

8. The method of claim 6, wherein at least one of said plurality of price lists contains pricing information corresponding to a region.

9. The method of claim 6, further comprising:
providing a user interface by which a user may define groups of extended attributes; and
automatically generating a plurality of price list items comprising at least a portion of at least one of said plurality of price lists, said plurality of price list items corresponding to the groups of extended attributes defined.

10. The method of claim 1, further comprising:
defining a sequence in which pricing factors are applied; and
sequentially applying the pricing factors to the sellable object based on the sequence.

11. The method of claim 1, wherein:
said determining said pricing factors further comprises performing a search on said at least one table using by a pricing engine to build a run-time statement containing a search specification comprising a product name field, a customer name field, and a region field;
said determining said pricing factors further comprises sorting said pricing factors according to a priority system including three priority levels;
said generating further comprises performing pricing actions comprising performing addition to said static price, multiplying said static price by a factor, raising said static price to a power of a specified number, and rounding said dynamic price to a specified number of decimal places;
said executing further comprises ending said query upon reaching an exit factor; and
said sellable object comprises a web camera.

12. A machine-readable media storing instructions, which when executed by a processing system, cause the processing system to perform a method to dynamically price a sellable object, the method comprising:
providing a first user interface by which a user may define a list of products from which sellable objects may be defined, said list of products comprising descriptions of those products, and pricing information corresponding to those products;
providing a second user interface by which any user may define extended attributes pertaining to the products and pricing information corresponding to the extended attributes;
providing a third user interface by which any user may select a product from the list of products to build the sellable object;
providing a fourth user interface by which any user may selectively add for selectively adding an extended attribute to the selected product
determining a static price for the sellable object as a function of a base price of the selected product and a base price for the extended attribute selectively added to the selected product;
determining pricing factors that are applicable to the sellable object based on the selectively added attribute, wherein the pricing factors include a plurality of matrix-based pricing factors stored as a plurality of rows in at least one table in a database;
dynamically adjusting the static price for the sellable object based on the pricing factors determined to be applicable to the sellable object;
specifying at least one search criterion based on attributes of the sellable object;
generating a query identifying the at least one table to search using the search criteria; and
executing the query against a database in which said table is stored to identify at least one matrix-based pricing factor applicable to the sellable object.

13. The machine-readable media of claim 12, wherein the method further comprises:
providing a fifth user interface by which any user may define a plurality of extended attribute classes, each extended attribute class including at least one extended attribute; and
providing a sixth user interface by which any user may associate extended attribute classes with products in the list of products, wherein each product to which an extended attribute class is associated inherits the extended attributes defined for the respective extended attribute class.

14. The machine-readable media of claim 12, wherein the prices for products and the extended attributes associated with the products are defined using a first currency, and wherein the method further comprises:
providing a fifth user interface by which any user may select a second currency to be used in pricing the sellable object;
calculating an exchange rate between the first currency and the second currency; and
multiplying the dynamically adjusted static price of the sellable object by the exchange rate.

15. The machine-readable media of claim 12, wherein the method further comprises providing a fifth user interface by which any user may create a plurality of price lists, each price list comprising base prices corresponding to at least a subset of the products in the list of products.

16. The machine-readable media of claim 15, wherein the method further comprises:
- providing a sixth user interface by which any user may define groups of extended attributes; and
- generating a plurality of price list items comprising at least a portion of at least one of said plurality of price lists, said plurality of price list items corresponding to the groups of extended attributes.

17. The machine-readable media of claim 12, wherein the method further comprises:
- providing a fifth user interface by which any user may define a sequence in which the pricing factors are applied; and
- sequentially applying the pricing factors to the sellable object based on the defined sequence.

18. A computer-implemented system comprising a distributed multi-tier architecture, wherein the distributed multi-tier architecture comprises:
- a client machine tier comprising a client machine running a client-side software;
- an application server tier comprising a application server coupled in communication with said client machine via a first computer network, each application server running a middleware software; and
- a database tier comprising at least one database server running database server software to host a database in which data for the system are stored, each database server coupled in communication with the one application server via a second computer network,
- wherein execution of the client-side, middleware, and database server software cooperatively performs operations comprising:
  - providing a first user interface on the client machine by which a user may select products from a list of products stored in the database to define a sellable object;
  - providing a second user interface on the client machine by which any user may selectively add an extended attribute to one of the selected products;
  - determining a static price for the sellable object as a function of a base price of the selected products and a base price for the extended attribute selectively added to the one of the selected products;
  - determining pricing factors that are applicable to the sellable object based on -attributes of the sellable object or the extended attribute added to the one of the selected products, wherein the pricing factors include a plurality of matrix-based pricing factors stored as a plurality of rows in at least one table in a database;
  - dynamically adjusting the static price for the sellable object based on the pricing factors determined to be applicable to the sellable object;
  - specifying at least one search criterion based on attributes of the sellable object;
  - generating a query identifying the at least one table to search using the search criteria; and
  - executing the query against a database in which said table is stored to identify at least one matrix-based pricing factor applicable to the sellable object.

19. The system of claim 18, wherein the pricing factors comprise a plurality of matrix-based pricing factors stored as a plurality of rows in at least one table stored by the database server, and wherein execution of the client-side, middleware, and database server software further performs the operations of:
- specifying a search criterion based on the attributes of the sellable object;
- generating a query identifying at least one table to search using the search criteria; and
- executing the query against the database server in which said table is stored to identify at least one matrix-based pricing factor applicable to the sellable object.

20. The system of claim 18, wherein execution of the client-side, middleware, and database server software further performs the operations of:
- providing a third user interface on the client machine by which any user may define a plurality of extended attribute classes, each extended attribute class including at least one extended attribute; and
- providing a fourth user interface on the client machine by which any user may associate extended attribute classes with products, wherein each product inherits the extended attributes defined for the associated extended attribute class.

21. The system of claim 18, wherein the base prices for products and extended attributes associated with the products are defined using a first currency, and wherein execution of the client-side, middleware, and database server software further performs operations of:
- providing a third user interface on the client machine by which any user may select a second currency to be used in pricing the sellable object; calculating an exchange rate between the first and second currencies; and
- multiplying the dynamically adjusted static price of the sellable object by the exchange rate.

22. The system of claim 18, wherein the execution of the client-side, middleware, and database server software further performs the operations of:
- providing a third user interface on the client machine by which any user may define product descriptions and pricing information; and
- storing data corresponding to the product descriptions and the product pricing information in the database.

23. The system of claim 18, wherein execution of the client-side, middleware, and database server software further performs the operations of:
- providing a third user interface on the client machine by which any user may define extended attribute descriptions and pricing information corresponding to extended attributes that may be associated with various products; and
- storing data corresponding to the extended attribute descriptions and pricing information in the database.

24. The system of claim 18, wherein execution of the client-side, middleware, and database server software further performs the operations of:
- providing a third user interface on the client machine by which any user may define pricing factors based on products, extended attributes of those products, and transaction attributes; and
- storing data corresponding to the pricing factors in the database.

25. The system of claim 18, wherein execution of the client-side, middleware, and database server software further performs the operation of rendering a third user interface on the client machine by which any user may create a plurality of price lists, each price list comprising base prices corresponding to at least a subset of the products in the list of products.

26. The system of claim 25, wherein execution of the client-side, middleware, and database server software further performs the operations of:

provifing a fourth user interface on the client machines to enable any user to define groups of extended attributes; and automatically generating a plurality of price list items comprising at least a portion of at least one of said plurality of price lists, said plurality of price list items corresponding to the groups of extended attributes defined.

27. The system of claim 18, wherein execution of the client-side, middleware, and database server software further performs operations of:

providing a third user interface on the client machine by which any user may define a sequence in which pricing factors are applied; and sequentially applying the pricing factors to the sellable object based on the sequence.

* * * * *

UNITED STATES PATENT AND TRADEMARK OFFICE
CERTIFICATE OF CORRECTION

| | | |
|---|---|---|
| PATENT NO. | : 7,454,367 B2 | Page 1 of 1 |
| APPLICATION NO. | : 10/109957 | |
| DATED | : November 18, 2008 | |
| INVENTOR(S) | : Yu et al. | |

It is certified that error appears in the above-identified patent and that said Letters Patent is hereby corrected as shown below:

In column 11, line 23, before "attribute" delete "a" and insert -- an --, therefor.

In column 17, line 52, after ""MEDIA" row" insert -- ) --.

In column 17, line 57, delete "244A and 244A" and insert -- 244A and 244B --, therefor.

In column 25, line 48, in Claim 18, delete "on –attributes" and insert -- on attributes --, therefor.

Signed and Sealed this

Thirteenth Day of April, 2010

David J. Kappos
*Director of the United States Patent and Trademark Office*